(12) United States Patent
Sturgeon et al.

(10) Patent No.: US 11,465,665 B2
(45) Date of Patent: Oct. 11, 2022

(54) WAGON WITH RECLINE SEATBACK

(71) Applicant: Radio Flyer Inc., Chicago, IL (US)

(72) Inventors: Samantha Sturgeon, Chicago, IL (US); Anne Goodman, Chicago, IL (US)

(73) Assignee: Radio Flyer Inc., Chicago, IL (US)

(*) Notice: Subject to any disclaimer, the term of this patent is extended or adjusted under 35 U.S.C. 154(b) by 0 days.

(21) Appl. No.: 17/066,667

(22) Filed: Oct. 9, 2020

(65) Prior Publication Data

US 2021/0107551 A1    Apr. 15, 2021

Related U.S. Application Data

(60) Provisional application No. 62/912,703, filed on Oct. 9, 2019.

(51) Int. Cl.
| | |
|---|---|
| *B62B 7/00* | (2006.01) |
| *B62B 9/10* | (2006.01) |
| *B62B 7/06* | (2006.01) |
| *B62B 7/04* | (2006.01) |
| *B62B 7/12* | (2006.01) |

(52) U.S. Cl.
CPC ............. *B62B 9/104* (2013.01); *B62B 7/042* (2013.01); *B62B 7/062* (2013.01); *B62B 7/12* (2013.01)

(58) Field of Classification Search
CPC .. B62B 9/104; B62B 9/24; B62B 9/14; B62B 9/102; B62B 9/142; B62B 9/147; B62B 9/20; B62B 9/206; B62B 7/062; B62B 7/042; B62B 7/12; B62B 7/06; B62B 7/008; B62B 7/04; B62B 5/064; B62B 5/082; B62B 5/06; B62B 5/08; B62B 3/007; B62B 3/025; B62B 3/00; B62B 3/02

See application file for complete search history.

(56) References Cited

U.S. PATENT DOCUMENTS

| | | |
|---|---|---|
| 1,371,198 A | 3/1921 | Conrad |
| 1,465,211 A | 8/1923 | Dunkelberger |
| (Continued) | | |

FOREIGN PATENT DOCUMENTS

| | | |
|---|---|---|
| CN | 102166068 B | 5/2013 |
| GB | 190407310 | 8/1904 |
| (Continued) | | |

OTHER PUBLICATIONS

International Search Report and Written Opinion issued to PCT/US20/24924, dated Jan. 11, 2021.

(Continued)

*Primary Examiner* — James M Dolak
(74) *Attorney, Agent, or Firm* — Barnes & Thornburg LLP

(57) ABSTRACT

A stroller wagon having a wagon frame, a push bar and a flexible housing with a recline seatback is provided. The wagon frame has a first end assembly and an opposing second end assembly. First and second rear wheels are rotatably connected to the wagon frame adjacent the second end assembly, and first and second front wheels are rotatably and pivotally connected to the wagon frame adjacent the first end assembly. The push bar has a ratchet mechanism to pivotally secure the push bar in a plurality of angularly located positions. The recline seatback is adapted to pivot about a hinge, and has a seatback lock assembly to fix the seatback in a plurality of angled positions.

26 Claims, 18 Drawing Sheets

(56) References Cited

U.S. PATENT DOCUMENTS

| | | | |
|---|---|---|---|
| 1,489,443 A | 4/1924 | Kelly | |
| 1,771,813 A | 7/1930 | Norman | |
| 1,820,466 A | 8/1931 | Chaim | |
| 2,020,766 A | 11/1935 | Brown | |
| 2,471,553 A | 5/1949 | Zuckerman | |
| 2,563,995 A | 8/1951 | East | |
| 2,575,189 A | 11/1951 | Schmidt | |
| 2,942,679 A | 6/1960 | Gibson | |
| 2,984,514 A | 5/1961 | Lemley | |
| 2,989,318 A | 6/1961 | Libby | |
| 3,116,935 A | 1/1964 | Mitchin et al. | |
| 3,162,460 A | 12/1964 | Davidson | |
| 3,893,532 A | 7/1975 | Perlowin | |
| 4,227,709 A | 10/1980 | Gradwohl et al. | |
| 4,449,322 A | 5/1984 | Blumenthal | |
| 4,706,986 A | 11/1987 | Kassai | |
| 4,735,426 A * | 4/1988 | McConnell | B62B 7/008 |
| | | | 280/47.35 |
| 4,741,552 A | 5/1988 | Kassai | |
| 4,746,140 A | 5/1988 | Kassai | |
| 4,763,907 A | 8/1988 | Raymond | |
| 4,796,909 A | 1/1989 | Kirkendall | |
| 4,811,968 A | 3/1989 | Bolden | |
| 4,824,137 A | 4/1989 | Bolden | |
| 4,844,493 A | 7/1989 | Kramer | |
| 4,856,810 A | 8/1989 | Smith | |
| 4,878,682 A | 11/1989 | Lee | |
| 4,887,836 A | 12/1989 | Simjian | |
| 5,050,900 A | 9/1991 | Lee | |
| 5,333,893 A | 8/1994 | Chen | |
| 5,360,222 A | 11/1994 | Bro et al. | |
| 5,423,592 A | 6/1995 | Spurrier et al. | |
| 5,538,267 A | 7/1996 | Pasin et al. | |
| 5,657,828 A | 8/1997 | Nagamachi | |
| 5,699,647 A | 12/1997 | Weder et al. | |
| 5,746,282 A | 5/1998 | Fujiwara et al. | |
| 5,806,864 A | 9/1998 | Zielinski et al. | |
| 5,833,251 A | 11/1998 | Peck | |
| 5,857,695 A | 1/1999 | Crowell | |
| 5,876,049 A | 3/1999 | Spear et al. | |
| 5,887,935 A * | 3/1999 | Sack | B62B 9/104 |
| | | | 296/122 |
| 5,911,432 A | 6/1999 | Song | |
| 5,915,723 A | 6/1999 | Austin | |
| 5,947,493 A | 9/1999 | Pasin et al. | |
| 5,957,482 A | 9/1999 | Shorter | |
| 6,010,145 A | 1/2000 | Liu | |
| 6,079,720 A | 6/2000 | Spear et al. | |
| 6,079,777 A | 6/2000 | Simmons et al. | |
| 6,127,392 A | 10/2000 | Lennox | |
| 6,142,491 A | 11/2000 | Darling, III | |
| 6,164,671 A | 12/2000 | Darling, III | |
| 6,220,611 B1 | 4/2001 | Shapiro | |
| 6,270,092 B2 | 8/2001 | Darling, III | |
| 6,276,471 B1 | 8/2001 | Kratzenberg et al. | |
| 6,318,740 B1 | 11/2001 | Nappo | |
| D458,648 S | 6/2002 | Chiappetta et al. | |
| 6,488,293 B1 | 12/2002 | Mitchell et al. | |
| 6,491,318 B1 | 12/2002 | Galt et al. | |
| 6,499,750 B1 | 12/2002 | Michelau | |
| 6,536,796 B1 | 3/2003 | Solomon | |
| 6,561,529 B2 | 5/2003 | Darling, III | |
| 6,581,945 B1 | 6/2003 | Shapiro | |
| 6,629,574 B2 | 10/2003 | Turner | |
| D483,419 S | 12/2003 | Chiappetta et al. | |
| 6,663,139 B1 | 12/2003 | Smith | |
| 6,733,026 B1 | 5/2004 | Robberson et al. | |
| 6,845,991 B1 | 1/2005 | Ritucci et al. | |
| 6,893,030 B2 | 5/2005 | Shapiro | |
| 6,908,100 B2 * | 6/2005 | Kassai | B62B 7/08 |
| | | | 280/642 |
| 6,916,028 B2 | 7/2005 | Shapiro | |
| 6,932,365 B2 | 8/2005 | Chiappetta et al. | |
| 6,973,940 B2 | 12/2005 | Kleineisel et al. | |
| 7,017,939 B2 | 3/2006 | Darling, III | |
| 7,066,485 B2 | 6/2006 | Shapiro | |
| 7,097,182 B1 | 8/2006 | Liu | |
| 7,118,115 B2 | 10/2006 | Abel | |
| 7,150,339 B2 | 12/2006 | Liao et al. | |
| 7,150,465 B2 | 12/2006 | Darling, III | |
| 7,163,213 B2 | 1/2007 | Chambers | |
| 7,210,545 B1 | 5/2007 | Waid | |
| 7,226,059 B1 | 6/2007 | Samuels | |
| D547,812 S | 7/2007 | Seckel et al. | |
| 7,284,797 B2 | 10/2007 | Huang | |
| D566,200 S | 4/2008 | Seckel et al. | |
| D570,424 S | 6/2008 | Blair | |
| D573,663 S | 7/2008 | Ogawa | |
| 7,392,994 B2 | 7/2008 | Darling, III | |
| 7,407,177 B2 | 8/2008 | Darling, III | |
| 7,461,857 B2 | 12/2008 | Darling, III | |
| 7,475,900 B2 | 1/2009 | Cheng | |
| 7,487,977 B2 * | 2/2009 | Johnson | B62B 3/007 |
| | | | 280/47.34 |
| 7,490,684 B2 | 2/2009 | Seymour et al. | |
| 7,523,955 B2 | 4/2009 | Blair | |
| 7,547,037 B2 | 6/2009 | Poppinga et al. | |
| 7,562,897 B1 | 7/2009 | Sherman et al. | |
| 7,584,985 B2 | 9/2009 | You et al. | |
| 7,625,033 B2 * | 12/2009 | Michelau | B62B 9/147 |
| | | | 296/177 |
| 7,661,156 B2 | 2/2010 | Thorne et al. | |
| 7,709,795 B2 | 5/2010 | Yamanaka et al. | |
| 7,731,221 B2 | 6/2010 | Bess | |
| 7,775,530 B2 | 8/2010 | Darling, III | |
| 7,823,906 B2 | 11/2010 | Darling, III | |
| 7,836,530 B2 | 11/2010 | Thorne et al. | |
| 8,011,686 B2 | 9/2011 | Chen et al. | |
| 8,060,959 B2 | 11/2011 | Thorne et al. | |
| 8,091,916 B2 | 1/2012 | Shapiro | |
| 8,120,190 B2 | 2/2012 | Bravo | |
| 8,127,392 B2 | 3/2012 | Wilson | |
| 8,191,907 B2 | 6/2012 | Watson | |
| 8,220,824 B2 | 7/2012 | Chen et al. | |
| 8,286,739 B2 | 10/2012 | Oliphant | |
| 8,297,642 B2 | 10/2012 | Tyson, III | |
| 8,388,015 B2 | 3/2013 | Chen | |
| 8,456,771 B2 | 6/2013 | Weber et al. | |
| 8,458,829 B2 | 6/2013 | Thorne et al. | |
| 8,490,732 B2 | 7/2013 | Sugimoto et al. | |
| 8,556,740 B1 | 10/2013 | Schneider | |
| 8,672,081 B2 | 3/2014 | Kume et al. | |
| 8,746,377 B1 | 6/2014 | Dunbar | |
| 8,746,710 B2 | 6/2014 | Schejbal | |
| 8,851,503 B2 * | 10/2014 | Tyson, III | A47C 1/14 |
| | | | 280/648 |
| 8,944,459 B1 | 2/2015 | Hagy | |
| 8,955,855 B2 * | 2/2015 | Herlitz | B62B 9/14 |
| | | | 280/47.38 |
| D723,762 S | 3/2015 | Treadwell | |
| 9,033,361 B2 | 5/2015 | Frankel et al. | |
| 9,045,152 B2 | 6/2015 | Sekine et al. | |
| 9,056,621 B1 | 6/2015 | Jin et al. | |
| 9,073,564 B2 | 7/2015 | Yang et al. | |
| 9,108,656 B1 | 8/2015 | Nolan et al. | |
| D738,436 S | 9/2015 | Cummings | |
| 9,145,154 B1 * | 9/2015 | Horowitz | B62B 7/008 |
| 9,211,897 B2 | 12/2015 | Yang et al. | |
| 9,242,663 B1 | 1/2016 | Nolan et al. | |
| D748,739 S | 2/2016 | Horowitz | |
| 9,327,749 B2 * | 5/2016 | Young | B62B 5/08 |
| 9,365,225 B2 | 6/2016 | Henao | |
| D763,532 S | 8/2016 | Huang | |
| 9,469,324 B2 * | 10/2016 | Bowman | B62B 3/007 |
| 9,580,095 B2 | 2/2017 | Vargas, II et al. | |
| 9,738,298 B1 | 8/2017 | Yang et al. | |
| 9,950,729 B2 * | 4/2018 | Choi | B62B 9/203 |
| 9,956,981 B1 * | 5/2018 | Fitzwater | E04H 15/60 |
| 10,077,062 B2 * | 9/2018 | Bowman | B62B 5/082 |
| 10,081,380 B2 | 9/2018 | Fitzwater et al. | |
| 10,300,934 B2 * | 5/2019 | Ostergaard | B62B 3/025 |
| 10,392,042 B2 | 8/2019 | Fitzwater et al. | |
| 10,507,857 B2 * | 12/2019 | Bowman | B62B 3/02 |
| 10,562,556 B1 * | 2/2020 | Horowitz | B62B 3/007 |

(56) References Cited

U.S. PATENT DOCUMENTS

| | | | |
|---|---|---|---|
| 10,583,852 B2* | 3/2020 | Fitzwater | B62B 5/082 |
| 10,597,058 B2* | 3/2020 | Bowman | B62B 3/022 |
| 11,235,792 B2* | 2/2022 | Delgatty | B62B 3/022 |
| 11,247,708 B2* | 2/2022 | Wang | B62B 3/025 |
| 2003/0025301 A1* | 2/2003 | Banuelos, III | B62B 3/022 |
| | | | 280/47.38 |
| 2003/0127835 A1 | 7/2003 | Shapiro | |
| 2003/0227158 A1 | 12/2003 | Kassai et al. | |
| 2004/0164512 A1 | 8/2004 | Gunter et al. | |
| 2004/0238469 A1 | 12/2004 | Ng | |
| 2005/0275195 A1 | 12/2005 | Matula et al. | |
| 2006/0119056 A1 | 6/2006 | Olsen | |
| 2007/0258435 A1 | 11/2007 | Saito et al. | |
| 2007/0284900 A1 | 12/2007 | Sze | |
| 2008/0041644 A1 | 2/2008 | Tudek et al. | |
| 2008/0073880 A1 | 3/2008 | Bess | |
| 2008/0217886 A1 | 9/2008 | Poppinga et al. | |
| 2009/0066114 A1 | 3/2009 | Molton | |
| 2009/0160150 A1 | 6/2009 | Johnson | |
| 2009/0161150 A1 | 6/2009 | Yu et al. | |
| 2010/0123294 A1 | 5/2010 | Ellington et al. | |
| 2010/0140902 A1 | 6/2010 | Zehfuss | |
| 2010/0156069 A1 | 6/2010 | Chen | |
| 2011/0025005 A1 | 2/2011 | Howell | |
| 2011/0204598 A1 | 8/2011 | Stevenson | |
| 2012/0211970 A1 | 8/2012 | Saito et al. | |
| 2012/0235372 A1 | 9/2012 | Herlitz et al. | |
| 2012/0274052 A1 | 11/2012 | Zhu | |
| 2013/0179016 A1 | 7/2013 | Gale | |
| 2013/0239322 A1 | 9/2013 | Thorne et al. | |
| 2014/0001735 A1 | 1/2014 | Yang et al. | |
| 2014/0196968 A1 | 7/2014 | Bieler et al. | |
| 2014/0353945 A1 | 12/2014 | Young et al. | |
| 2015/0035258 A1 | 2/2015 | Chen et al. | |
| 2015/0053042 A1 | 2/2015 | Shirakawa et al. | |
| 2015/0084298 A1 | 3/2015 | Herlitz et al. | |
| 2015/0145224 A1 | 5/2015 | Zhu | |
| 2015/0151771 A1 | 6/2015 | Jin et al. | |
| 2016/0347338 A1 | 12/2016 | Vargas, II et al. | |
| 2018/0057035 A1 | 3/2018 | Choi | |
| 2018/0208227 A1 | 7/2018 | Young et al. | |
| 2019/0023299 A1 | 1/2019 | Simmons et al. | |
| 2019/0185038 A1 | 6/2019 | Choi | |

FOREIGN PATENT DOCUMENTS

| | | |
|---|---|---|
| GB | 190407310 A | 8/1904 |
| JP | 2001-1706 | 1/2001 |
| JP | 2009-137521 | 6/2009 |
| JP | 2010-184696 | 8/2010 |

OTHER PUBLICATIONS

International Search Report and Written Opinion issued to PCT/US20/56827, dated Jan. 21, 2021 (16 pages).
International Preliminary Report on Patentability issued to PCT/US20/56827, dated May 5, 2022 (9 pages).
International Search Report and Written Opinion issued to PCT/US20/24924, dated Jan. 11, 2021 (17 pages).
International Search Report and Written Opinion issued to PCT/US20/48493, dated Nov. 20, 2020 (12 pages).
International Search Report and Written Opinion issued to PCT/US20/056827, dated Jan. 21, 2021 (16 pages).

* cited by examiner

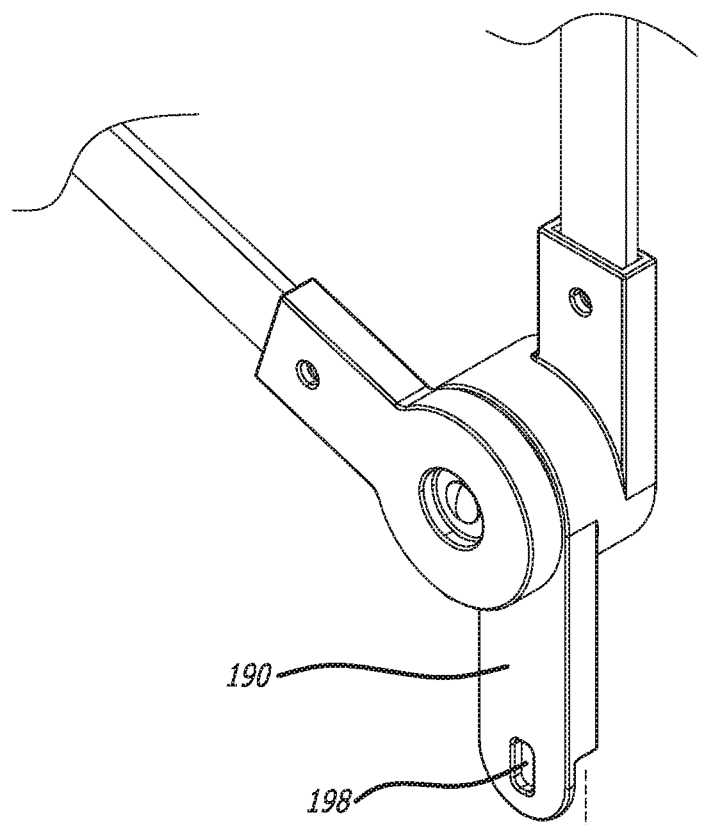
FIG. 14
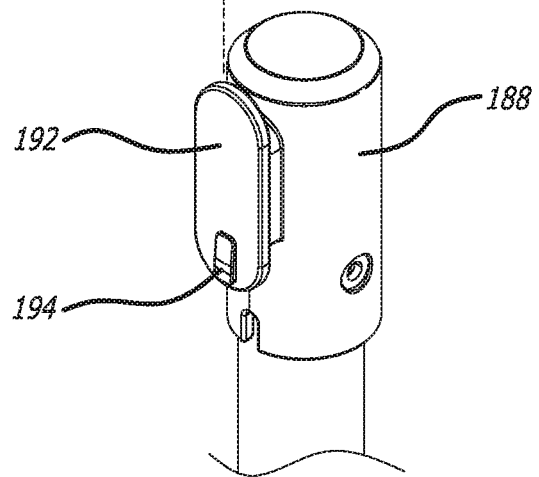

WAGON WITH RECLINE SEATBACK

CROSS-REFERENCE TO RELATED APPLICATIONS

This application claims the benefit of U.S. Provisional Patent Application No. 62/912,703 filed Oct. 9, 2019, which is expressly incorporated herein by reference and made a part hereof.

FEDERALLY SPONSORED RESEARCH OR DEVELOPMENT

Not Applicable.

TECHNICAL FIELD

The present disclosure relates generally to wagons, and more specifically to a stroller wagon that has recline seatback.

BACKGROUND

Wagons are used throughout the world and are well known in the art. While such wagons according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a stroller wagon having a push handle and a housing having a recline seatback.

The disclosed technology further relates to a stroller wagon comprising: a wagon frame having a first end and an opposing second end; a floor assembly connected to the wagon frame between the first end and the second end, wherein the wagon frame folds between an open configuration and a folded configuration; first and second rear wheels rotatably connected to the wagon frame adjacent the second end; first and second front wheels rotatably and pivotally connected to the wagon frame adjacent the first end; a handle pivotally connected to the first end of the wagon frame, the handle adapted to be transitioned between a use position and a storage position; a push bar pivotally connected to the second end of the wagon frame; a flexible housing connected to the wagon frame between the first end and the second end, the flexible housing having a recline seatback adjacent the second end of the wagon frame, the recline seatback adapted to be pivotally positioned in a generally vertical position and a plurality of angled positions; and, a seatback lock assembly connected to the recline seatback, the seatback lock assembly removably fixing the seatback in a plurality of angled positions including a generally vertical position.

The disclosed technology further relates to a stroller wagon comprising: a wagon frame having a first end assembly and an opposing second end assembly; first and second rear wheels rotatably connected to the wagon frame adjacent the second end assembly; first and second front wheels rotatably and pivotally connected to the wagon frame adjacent the first end assembly; a push bar pivotally connected to the second end assembly, wherein the push bar has a ratchet mechanism to pivotally secure the push bar in a plurality of angularly located use positions and a storage position; a flexible housing connected to the wagon frame between the first end and the second end, the flexible housing having a recline seatback adjacent the second end of the wagon frame, the recline seatback adapted to pivot about a hinge; and, a seatback lock assembly connected to the recline seatback, the seatback lock assembly removably fixing the seatback in a plurality of angled positions including a generally vertical position.

The disclosed technology further relates to a stroller wagon comprising: a wagon frame having a first end assembly and an opposing second end assembly, wherein the first end assembly comprises first and second front vertical members connected by a front lower cross support towards a bottom of the first and second front vertical members, wherein the second end assembly comprises first and second rear vertical members connected by a rear lower cross support towards a bottom of the first and second rear vertical members, and wherein the wagon frame folds to bring the first end assembly toward the second end assembly; first and second rear wheels rotatably connected to the wagon frame adjacent the second end assembly; first and second front wheels rotatably and pivotally connected to the wagon frame adjacent the first end assembly; a flexible housing connected to the wagon frame between the first end assembly and the second end assembly, the flexible housing having a recline seatback adjacent the second end assembly, the recline seatback adapted to pivot about a hinge; a first canopy receiver connected to a top of the first front vertical member; a second canopy receiver connected to a top of the second front vertical member; a third canopy receiver connected to a top of the first rear vertical member; a fourth canopy receiver connected to a top of the second rear vertical member; a first independent canopy having first and second snap on connectors that removably secure to the first and second canopy receivers, respectively; and, a second independent canopy having first and second snap on connectors that removably secure to the third and fourth canopy receivers, respectively.

The disclosed technology further relates to a stroller wagon wherein the lock assembly comprises a locking member and first and second straps, wherein the first strap is connected to a first vertical member at the second end of the wagon frame, wherein the second strap is connected to a second vertical member at the second end of the wagon frame, The disclosed technology further relates to a stroller wagon wherein the locking member has an opening to receive the first and second straps, a spring member to exert pressure on the straps in the opening to retain the first and second straps in the desired position, and a release member to move the spring member to an open position to allow the first and second straps to transition in the opening of the locking member.

The disclosed technology further relates to a stroller wagon wherein the flexible housing comprises opposing sidewalls between the first end and the second end of the wagon frame, a front wall adjacent the first end of the wagon frame, a bottom wall adjacent the floor assembly of the wagon frame, and the recline seatback adjacent the second end of the wagon frame, and wherein the recline seatback has a padded surface.

The disclosed technology further relates to a stroller wagon wherein the flexible housing further comprises a pair of flexible fabric gussets connecting the recline seatback to the respective opposing sidewalls of the flexible housing.

The disclosed technology further relates to a stroller wagon wherein the reclining seatback is connected to the bottom wall of the flexible housing at a hinge.

The disclosed technology further relates to a stroller wagon wherein the hinge of the reclining seatback is positioned a distance from an end of the bottom wall adjacent the second end of the wagon frame.

The disclosed technology further relates to a stroller wagon wherein the push bar is lockably positionable in a storage position and a plurality of use positions.

The disclosed technology further relates to a stroller wagon wherein the wagon frame has a first end assembly at the first end of the wagon frame, and an opposing second end assembly at a second end of the wagon frame.

The disclosed technology further relates to a stroller wagon wherein the first end assembly comprises a pair of front vertical members connected by a front lower cross support towards a bottom of the pair of front vertical members, wherein the second end assembly comprises a pair of rear vertical members connected by a rear lower cross support towards a bottom of the pair of rear vertical members, wherein the wagon frame has no cross support towards a top of the first end assembly, and wherein the wagon frame has no cross support towards a top of the second end assembly.

The disclosed technology further relates to a stroller wagon wherein the first end assembly comprises a pair of front vertical members, wherein the second end assembly comprises a pair of rear vertical members, and wherein each of the vertical members has a canopy receiver at a top thereof.

The disclosed technology further relates to a stroller wagon further comprising a first independent canopy at the first end of the wagon frame and a second independent canopy at the second end of the wagon frame, the first independent canopy having first and second snap on connectors that removably secure to the receivers of the pair of front vertical members, respectively, and the second independent canopy having first and second snap on connectors that removably secure to the receivers of the pair rear vertical members, respectively.

The disclosed technology further relates to a stroller wagon wherein the first independent canopy and the second independent canopy are each independently attachable and removable from the wagon.

The disclosed technology further relates to a stroller wagon wherein the handle is spring loaded and biased toward the vertical position.

The disclosed technology further relates to a stroller wagon wherein the push bar is connected to the second end of the wagon frame, and wherein the push bar has a ratchet mechanism to pivotally secure the push bar in a plurality of angular positions.

The disclosed technology further relates to a stroller wagon further comprising a spring-loaded button to disengage a ratchet in the ratchet mechanism to adjust an angular position of the push bar.

The disclosed technology further relates to a stroller wagon wherein the floor assembly comprises a first floor assembly pivotal with respect to the first end of the wagon frame, and a second floor assembly pivotal with respect to the second end of the wagon frame, and wherein the first floor assembly is pivotable with respect to the second floor assembly to allow for folding of the wagon frame.

The disclosed technology further relates to a stroller wagon further comprising a linkage assembly under the floor assembly, the linkage assembly having a first linkage pivotally connected to the first end of the wagon frame and a second linkage pivotally connected to the second end of the wagon frame, wherein the first linkage is also pivotally connected to the second linkage.

The disclosed technology further relates to a stroller wagon wherein the seatback lock assembly comprises a locking member and first and second straps, wherein the first strap is connected to a first vertical member of the second end assembly and wherein the second strap is connected to a second vertical member of the second end assembly.

The disclosed technology further relates to a stroller wagon wherein the locking member has an opening to receive the first and second straps, a release member to open and close the opening to allow the first and second straps to transition in the opening of the locking member, and a spring member to exert pressure on the release members to retain the first and second straps in the desired position.

The disclosed technology further relates to a stroller wagon wherein the first end assembly comprises a pair of front vertical members, wherein the second end assembly comprises a pair of rear vertical members, and wherein each of the vertical members has a canopy receiver at a top thereof, and further comprising a first independent canopy and a second independent canopy, the first independent canopy having first and second snap on connectors that removably secure to the receivers of the pair of front vertical members, respectively, and the second independent canopy having first and second snap on connectors that removably secure to the receivers of the pair of rear vertical members, respectively.

The disclosed technology further relates to a stroller wagon wherein the wagon frame folds between an open configuration and a folded configuration, wherein the wagon frame has a floor assembly between the first end assembly and the second end assembly, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame, wherein the wagon frame further has a linkage assembly under the floor assembly, the linkage assembly having a first linkage pivotally connected to the first end assembly and a second linkage pivotally connected to the second end assembly, wherein the first linkage is also pivotally connected to the second linkage.

The disclosed technology further relates to a stroller wagon further comprising a seatback lock assembly for the recline seatback, the seatback lock assembly comprising a locking member and first and second straps, wherein the first strap is connected to the first rear vertical member of the second end assembly and wherein the second strap is connected to the second rear vertical member of the second end assembly.

The disclosed technology further relates to a stroller wagon wherein the locking member has an opening to receive the first and second straps, a spring member to bias the locking member to the closed position, and a release member to open and close the opening on the first and second straps to allow the first and second straps to transition in the opening of the locking member.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings:

FIG. 14 is a front partial perspective view of the canopy connector of the canopy assembly and canopy receiver of the wagon frame for the stroller wagon of FIG. 1 according to one embodiment.

DETAILED DESCRIPTION

Figure 1:
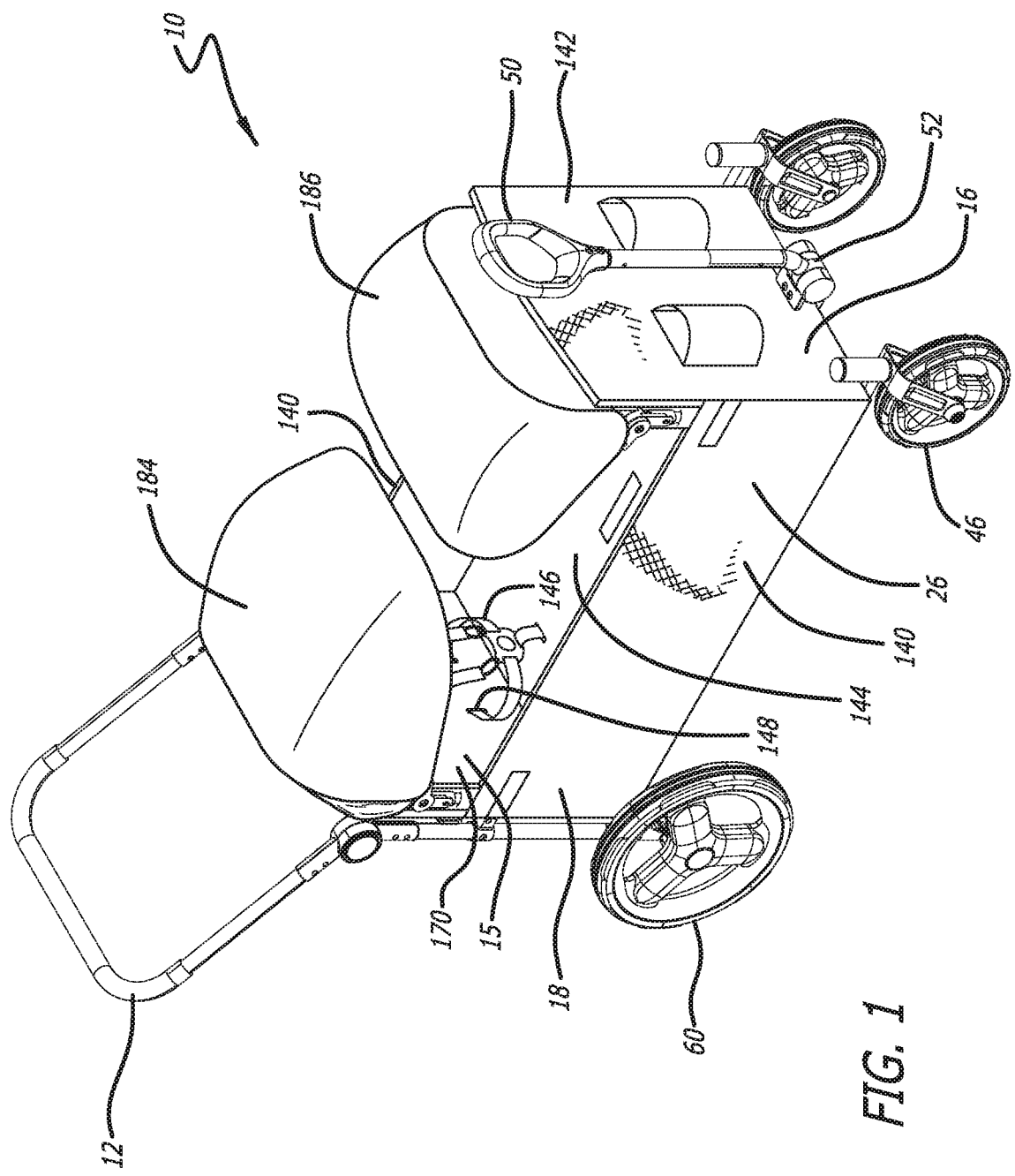
FIG. 1 is a top front perspective view of a stroller wagon with a recline seatback and independent canopies according to one embodiment.

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Figure 2:
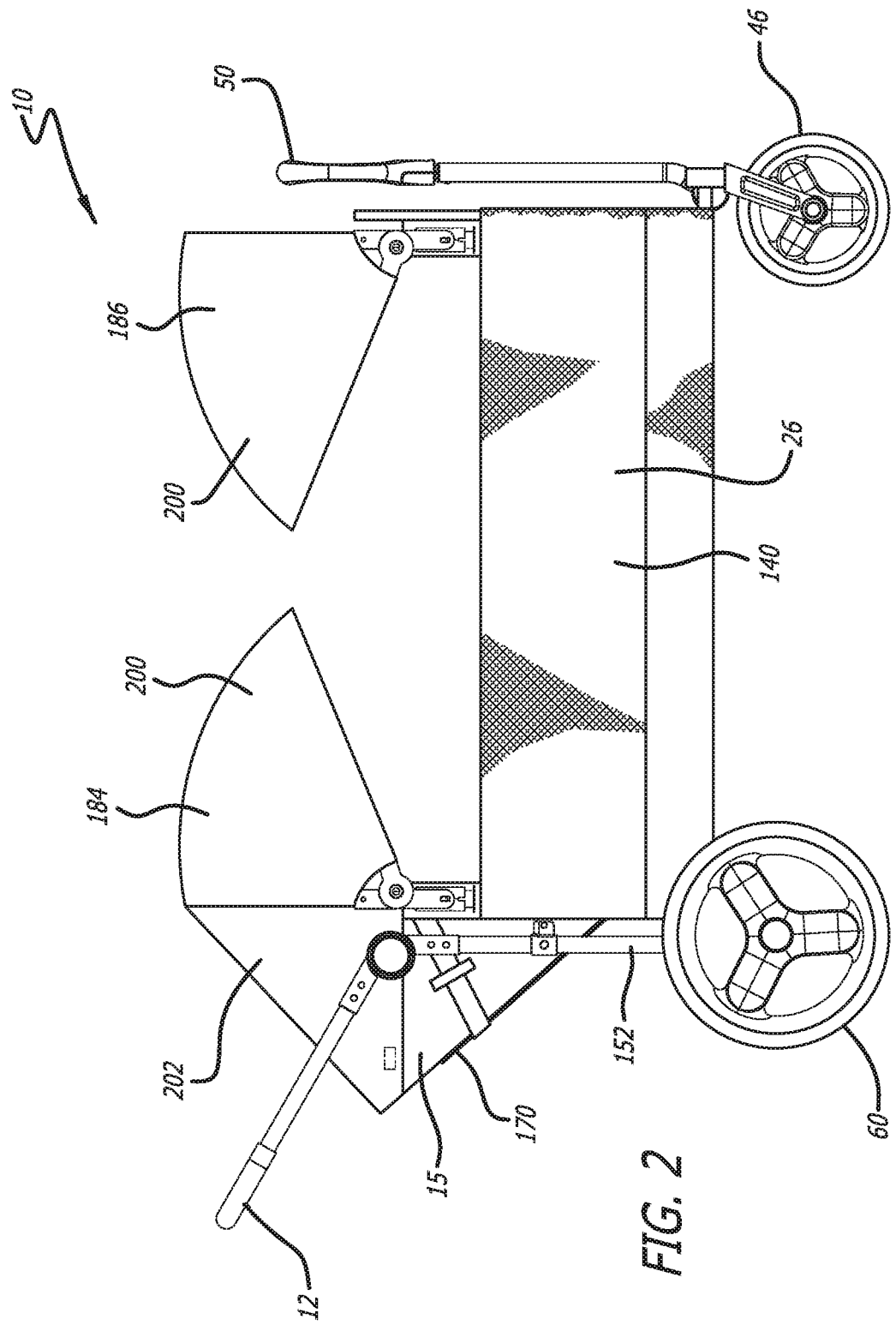
FIG. 2 is a side elevation view of the stroller wagon of FIG. 1 with one seatback in the reclined position.
Figure 16:
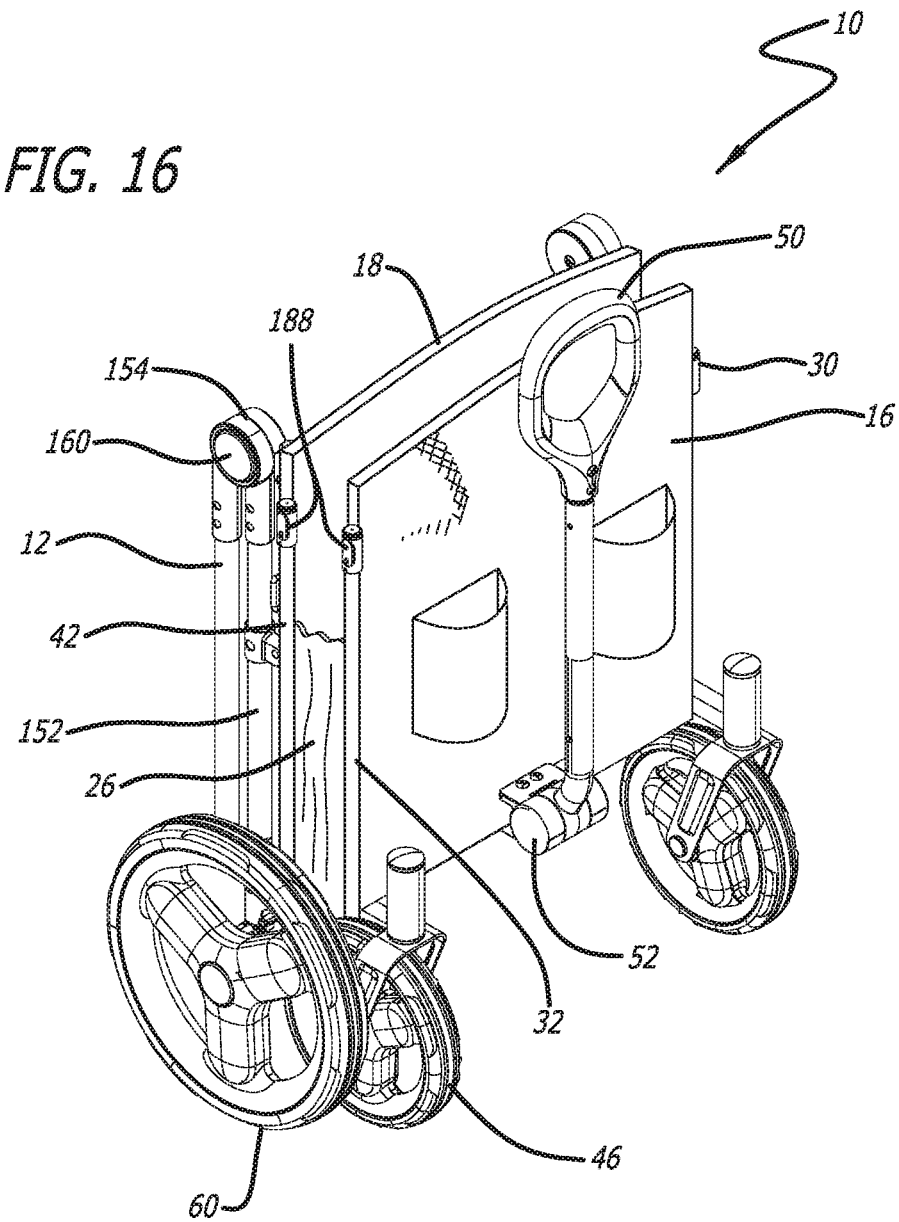
FIG. 16 is a front perspective view of the stroller wagon of FIG. 1 in the folded position according to one embodiment.

Referring now to the figures, and initially to FIGS. 1 and 2, a stroller wagon 10 having a recline seatback 15 is illustrated. In various embodiments, the stroller wagon 10 may be a foldable wagon 10 that includes a foldable push bar 12 and a collapsible or foldable wagon frame assembly 14 that is moveable between an unfolded or use configuration (FIGS. 1-5) and a collapsed or folded configuration (FIG. 16). Alternately, however, the wagon frame assembly 14 need not be collapsible or foldable. Additionally, the push bar 12 is not required, and the wagon may be a standard wagon, such as a wooden wagon or plastic wagon.

Figure 3:
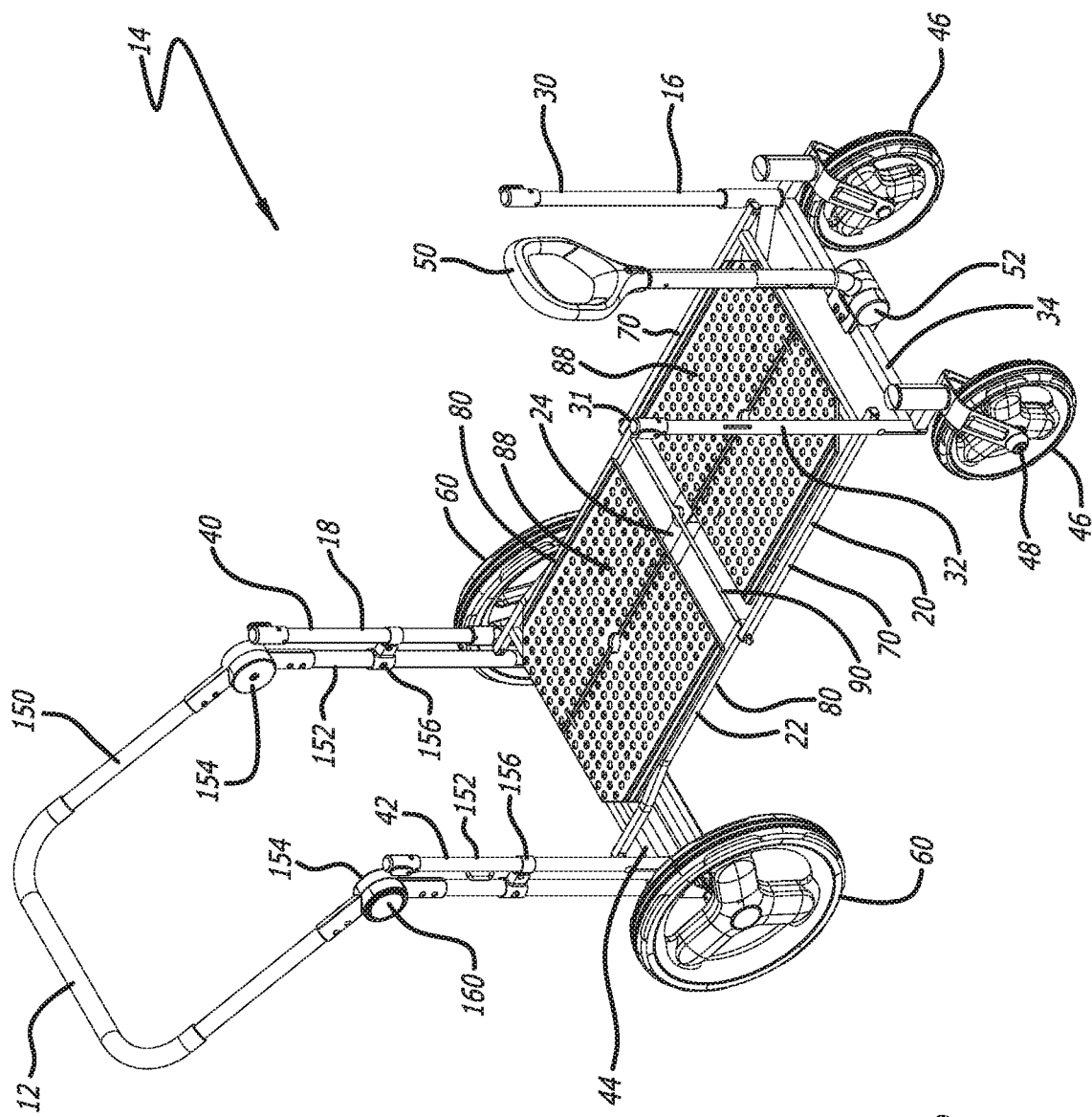
FIG. 3 is a top front perspective view of a frame for a folding stroller wagon according to one embodiment.
Figure 4:
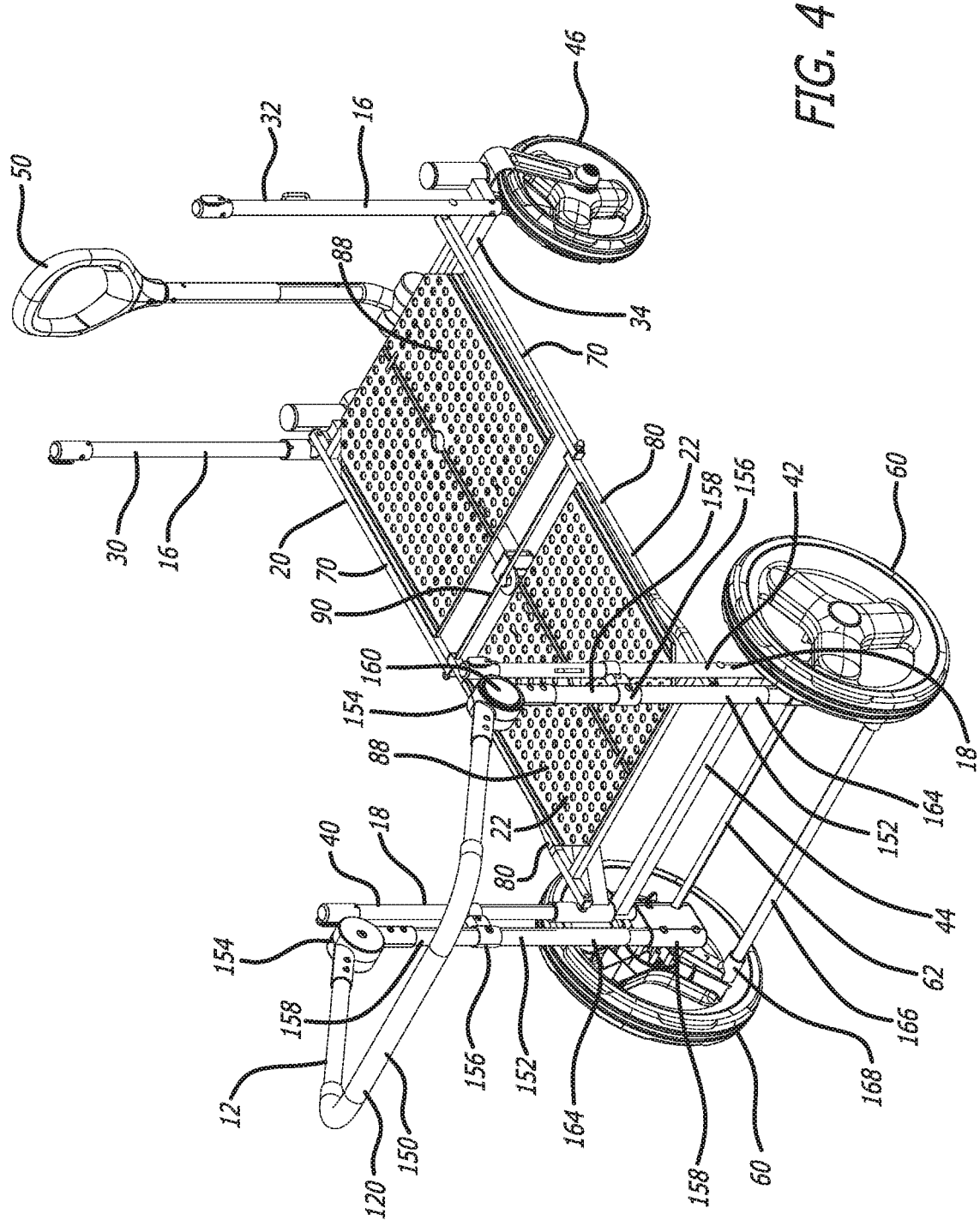
FIG. 4 is a rear perspective view of a frame for a folding stroller wagon according to one embodiment.
Figure 5:
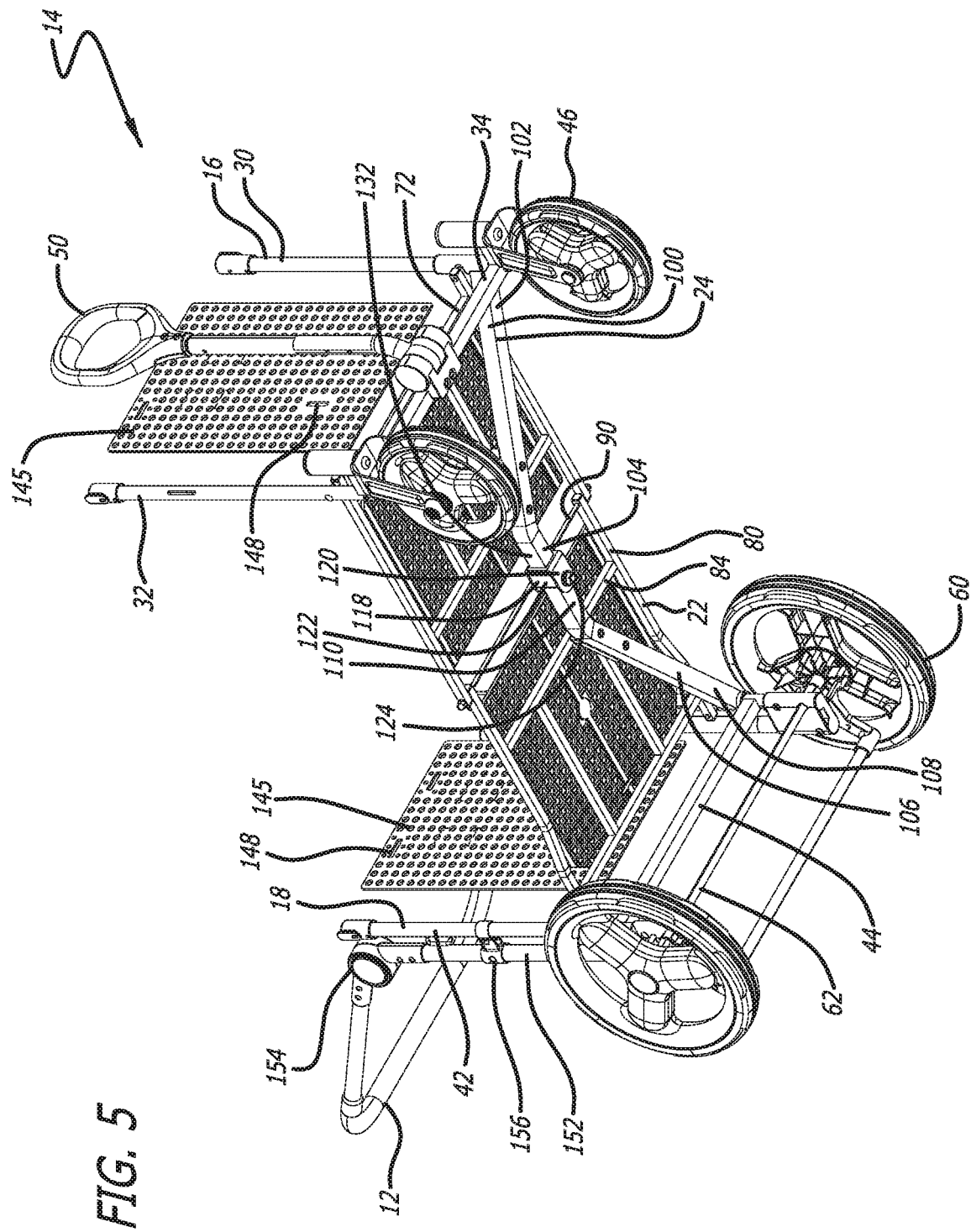
FIG. 5 is a bottom perspective view of a frame for a folding stroller wagon according to one embodiment.

In one embodiment of the stroller wagon 10 where the wagon 10 is foldable, as shown in FIGS. 3-5, the wagon frame assembly 14 includes a first end assembly 16 at a first end of the wagon frame, an opposing second end assembly 18 at a second end of the wagon frame, a floor assembly connected to the wagon frame between the first end and the second end, and a linkage assembly 24 connecting the first end assembly 16 to the second end assembly 18. In one embodiment the floor assembly comprises a first floor assembly 20 pivotally connected to and extending from the first end assembly 16, a second floor assembly 22 pivotally connected to and extending from the second end assembly 18. Additionally, as shown in FIG. 1, the foldable wagon 10 includes a flexible housing 26 connected to the foldable wagon frame assembly 14.

In one embodiment, the first end assembly 16 generally comprises two vertical members 30 and 32 (i.e., a pair of front vertical members) connected by a front lower cross support 34 towards a bottom of the two vertical members 30 and 32. Similarly, in one embodiment the second end assembly 18 generally comprises two vertical members 40 and 42 (i.e., a pair of rear vertical members) connected by a rear lower cross support 44 towards a bottom of the two vertical members 40 and 42. In a preferred embodiment, as shown in FIGS. 3-5, the wagon frame 14 has no cross support towards a top of the first end assembly 16 and has no cross support towards a top of the second end assembly 18.

In various embodiments, the wagon 10 includes two front wheels 46 (i.e., first and second front wheels) rotatably and pivotally connected to the frame assembly 14 adjacent the first end assembly 16. The front wheels 46 rotate about their axles 48. In one embodiment, the front wheels 46 may be pivotable caster assemblies.

Figure 18:
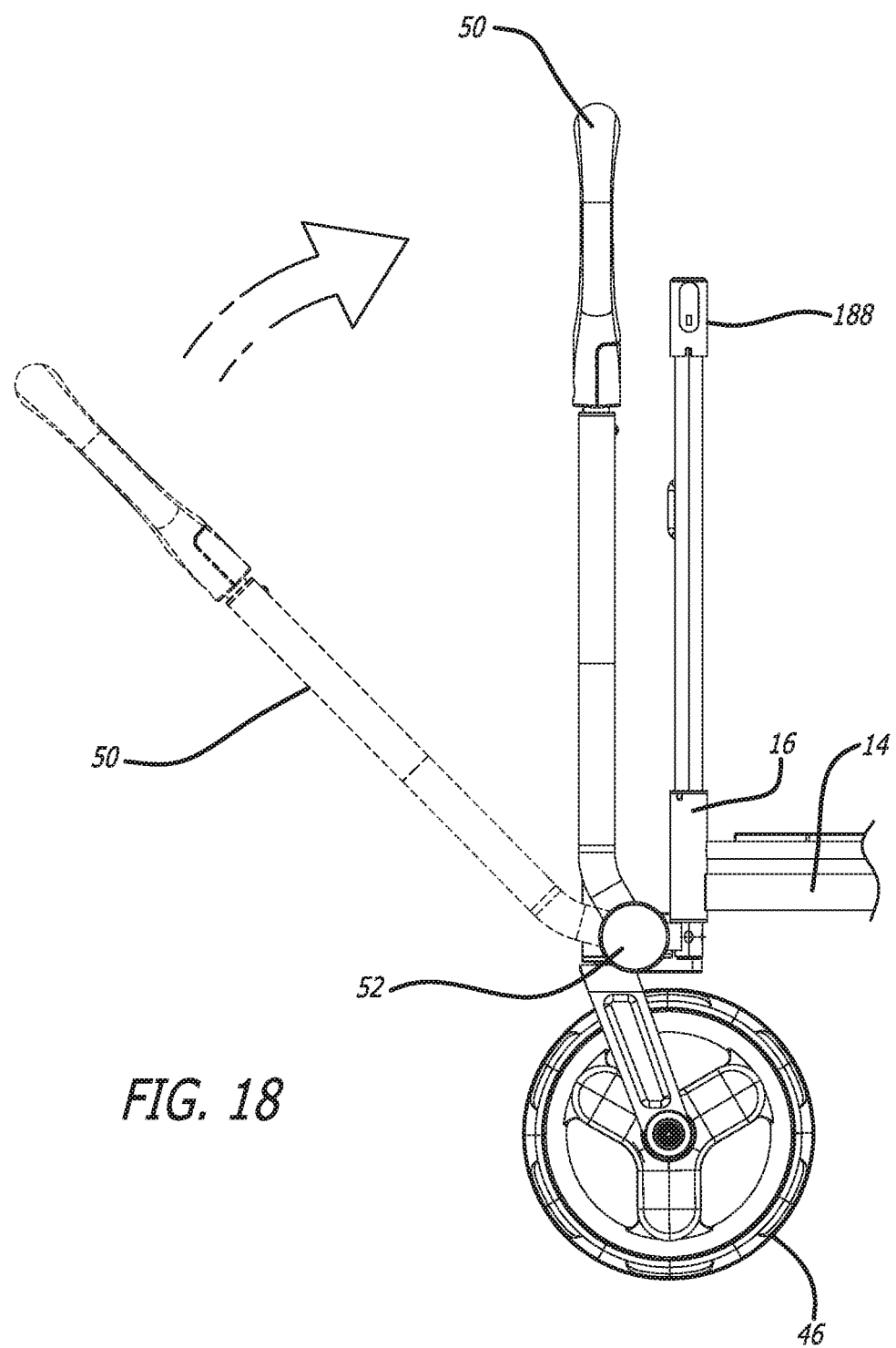
FIG. 18 is a partial side elevation view of the stroller wagon of FIG. 1 showing the pivotable pull handle according to one embodiment.
Figure 19:
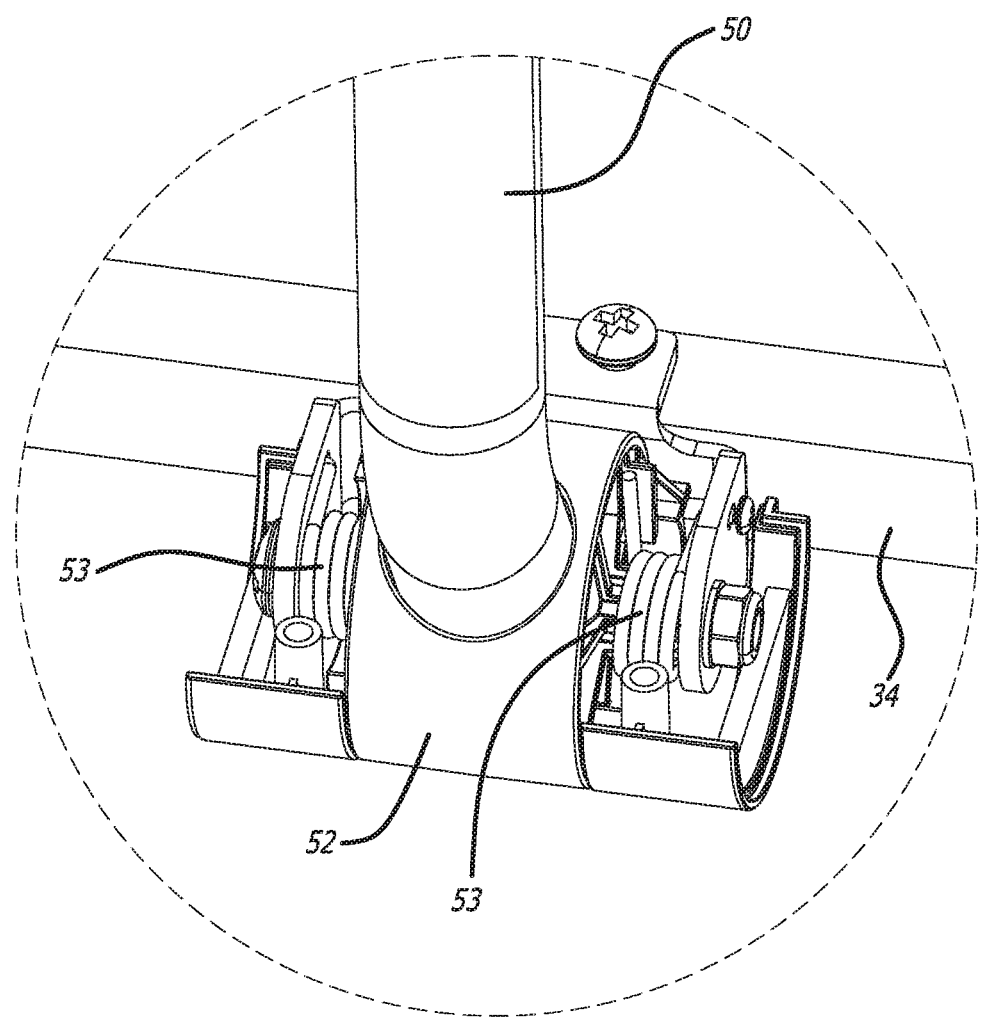
FIG. 19 is a partial front perspective view of a biasing mechanism for a pivotable pull handle for the stroller wagon of FIG. 1 according to one embodiment.

In one embodiment, the wagon 10 also includes a handle 50 connected to a pivoting knuckle assembly 52. The handle 50 is therefore preferably adapted to be transitioned between a use position, such as shown in FIG. 18, and a storage position, such as shown in FIG. 1 (and FIG. 18). The knuckle assembly 52 may be secured to the front lower cross support 34 of the first end assembly 16. In one embodiment, the handle 50 is biased toward the upright/vertical storage position, as shown in FIG. 18. The knuckle assembly 52 may be spring loaded, as shown in FIG. 19, and therefore have one or more springs 53, such as torsion springs, therein to bias the handle 50 upwardly so that when the handle 50 is not being manipulated by a user, it will remain vertically upward, as shown in FIGS. 1-5, so it will not impede movement of the wagon 10 when the wagon 10 is pushed by a user with the foldable push bar 12 adjacent the second end assembly 18.

The wagon 10 also preferably has two rear wheels 60 (i.e., first and second rear wheels) rotatably connected to the wagon frame adjacent the second end assembly 18. In one embodiment, the rear wheels 60 are rotatably connected to a fixed axle 62, however, in alternate embodiments the rear wheels 60 are connected to separate axles that are rotationally connected at opposing sides of the second end assembly 18.

In one embodiment, floor panels 88 may be secured to a top of the floor assemblies 20, 22 to provide a base or floor for the wagon 10, on which the flexible housing 26 may rest.

In one embodiment, the first and second floor assemblies 20, 22 are connected at a center brace 90. Preferably, the center brace 90 is pivotally connected to the first floor assembly 20 and the second floor assembly 22 to allow the first floor assembly 20 to be pivotally connected to the second floor assembly 22. In one embodiment, the center brace 90 is an elongated member, such as a shaft or a round or other shaped tube or solid member, that extends to connect each of the side members 70 and 80 of the first and second floor assemblies 20, 22 thereto. Additionally, in a preferred embodiment, the width of at least a portion of the first floor assembly 20 is greater than the width of at least a portion of the second floor assembly 22 to allow for at least a portion of the side members 70 of the first floor assembly 20 to be exterior but adjacent the side members 80 of the second floor assembly 20 for clearance purposes. The first and second floor assemblies 20, 22 preferably define the floor of the wagon 10.

As best shown in FIG. 5, in one embodiment, a single linkage assembly 24 connects the first end assembly 16 to the second end assembly 18, and provides rigidity to the wagon 10 in both the open and closed configurations, but also allows the wagon 10 to be collapsed or folded such that the first end assembly 16 and second end assembly 18 are adjacent one another. In one embodiment, the linkage assembly 24 comprises a first end linkage 100 and a second end linkage 106. The first end linkage 100 has a first end 102 and a second end 104. The first end 102 of the first end linkage 100 is pivotally connected to the first end assembly 16. The second end linkage 106 has a first end 108 and a second end 110. The first end 108 of the second end linkage 106 is pivotally connected to the second end assembly 18.

Further, in one embodiment the second end 104 of the first end linkage 100 is pivotally connected to the second end 110 of the second end linkage 106. In one embodiment, as shown in FIG. 5, the pivot connection 118 between the first end linkage 100 and the second end linkage 106 is that of a clevis 120 and tang 122 connection. A pin 124 joins the clevis 120 and tang 122, and allows the first end linkage 100 and the second end linkage 106 to pivot with respect to one another during opening and closing of the wagon 10. The first end linkage 100 and the second end linkage 106 form a two-bar linkage to assist in keeping the first end assembly 16 secured to the second end assembly 18 in both the open configuration (e.g., FIGS. 1 and 2) and the collapsed configuration (e.g., FIG. 16), as well as in the transition between the open and collapsed configuration.

In one embodiment, the wagon 10 also includes a housing assembly 26 connected to the wagon frame 14 that defines sidewalls, endwalls and preferably a bottom or floor of the wagon 10. In a preferred embodiment, the housing assembly 26 is made of fabric and is referred to as the flexible housing 26. As shown in FIG. 1, the flexible housing 26 preferably includes opposing sidewalls 140 between the first end and the second end of the wagon frame, a front wall or front end portion 142 adjacent the first end of the wagon frame, a rear wall or rear end portion 170 adjacent the second end of the wagon frame, a bottom wall 144 or floor 144 adjacent the floor assembly of the wagon frame. Additionally, in one embodiment, the end portions 142 and 170 of the housing assembly 26 have rigid wall members 145 therein (see FIG. 5) and preferably padding as well. The wagon 10 may also have safety belts 146 that secure through the end portions 142, 170 of the flexible housing 26 and to the rigid wall members 145. In one embodiment, the safety belts 146 are 5-point safety belts 146 that are adjustable to the size of the child in the wagon 10 with the use of openings 148 at varying heights along the end portions 142, 170 and rigid wall members 145 to accommodate different size children.

As shown in FIGS. 1-5 and 17, in various embodiments the wagon 10 also includes a foldable push bar 12 connected to the second end of the wagon frame 14. The foldable push bar 12 may comprise an upper push handle 150 and first and second lower push bar supports 152. The push handle 150 is pivotally connected to the first and second lower push bar supports 152 at a pair of ratchet mechanisms 154.

In one embodiment, the push bar 12 is secured to the wagon frame 14 via first and second upper connectors 156 and first and second lower connectors 158. As shown in FIGS. 3-5, in one embodiment, one of the upper connectors 156 secures the first lower push bar support 152 to the vertical member 40 of the wagon frame 14, and the other of the upper connectors 156 secures the second lower push bar support 152 to another vertical member 42 of the wagon frame 14. In one embodiment, the lower push bar supports 152 are secured to the wagon frame 14 a distance behind the wagon frame 14.

The upper push handle 150 preferably comprises a U-shaped member. One ratchet mechanism 154 is provided at a first end of the first lower push bar support 152 and another ratchet mechanism 154 is provided at a first end of the second lower push bar support 152. The two ratchet mechanisms 154 then secure to the two ends of the upper push handle 150.

Figure 17:
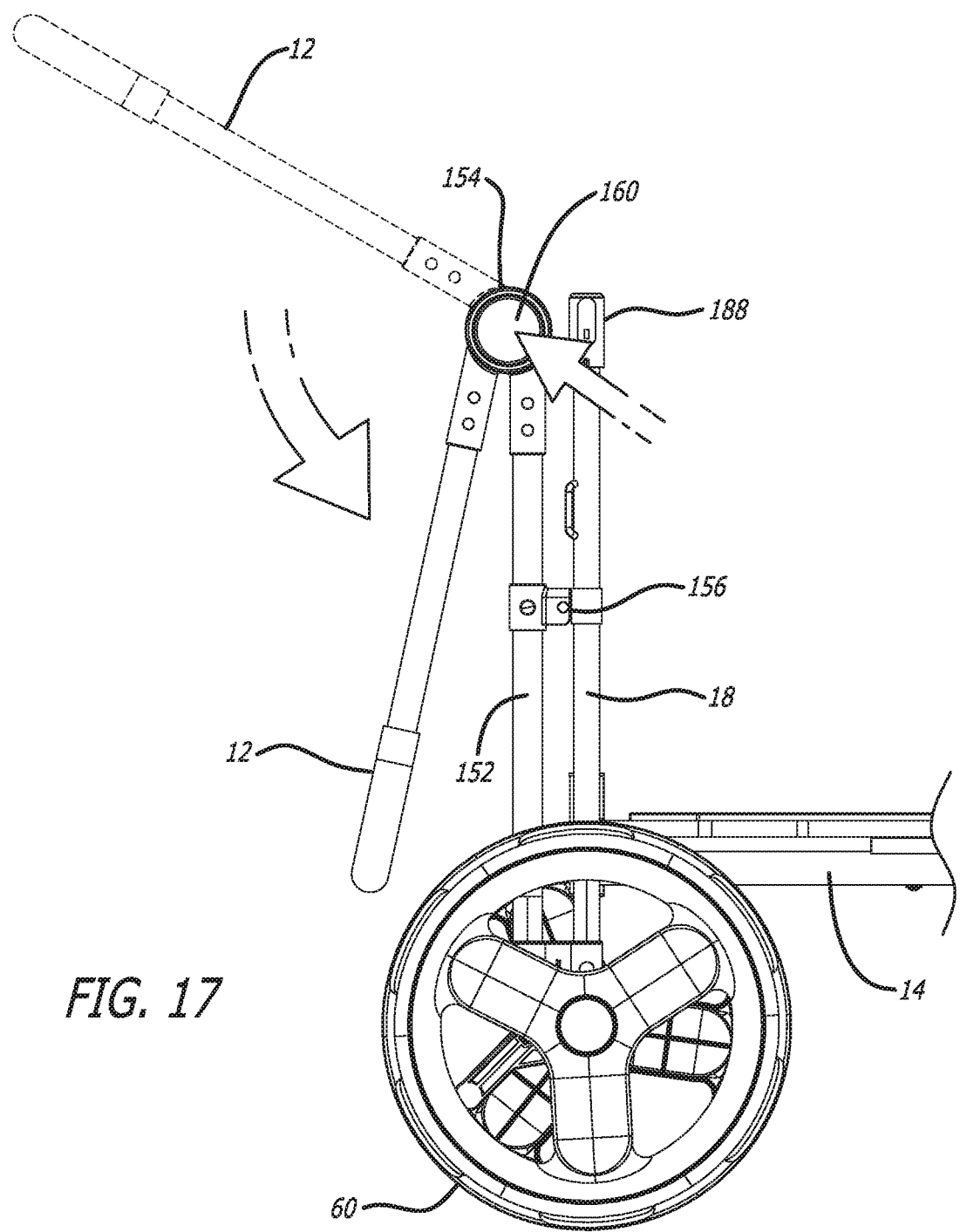
FIG. 17 is a partial side elevation view of the stroller wagon of FIG. 1 showing the pivotable push bar according to one embodiment.

In one embodiment, as shown in FIG. 17, the ratchet mechanisms 154 have a spring-loaded button 160 to disengage a ratchet in the ratchet mechanism 154. By depressing the button 160 on each ratchet mechanism 154, as shown in FIG. 17, the ratchet mechanism 154 is able to adjust and pivotally secure or lock the push handle 150 into a plurality of angular use positions for height adjustability for the user in the use position. Additionally, the ratchet mechanism 154 allows the push handle 150 to be placed into a storage position, as shown in FIGS. 16 and 17, when the handle 150 is folded adjacent the first and second lower push bar supports 152.

In one embodiment, the first lower connector 158 secures a second end 164 of the first lower push bar support 152 to vertical member 40 of the wagon frame 14, and the second lower connector 158 secures a second end 164 of the second lower push bar support 152 to vertical member 42 of the wagon frame 14 at the second end assembly 18 of the wagon 10. The lower connectors 158 also have openings to allow the rear axle 62 to extend through the connectors 158 and to be secured to the vertical members 40, 42.

The first and second lower connectors 158 are also referred to as brake push-bar brackets 158. That is because in one embodiment the lower connectors 158 pivotally support a brake bar 166 having a brake bracket 168. The brake bar is operable by a foot of a user. The brake brackets 168 each have a pin that engage spokes in the wheel hubs to lock the wheel hub with respect to the brake bar and prevent the rear wheels 60 from rotating.

Figure 8:
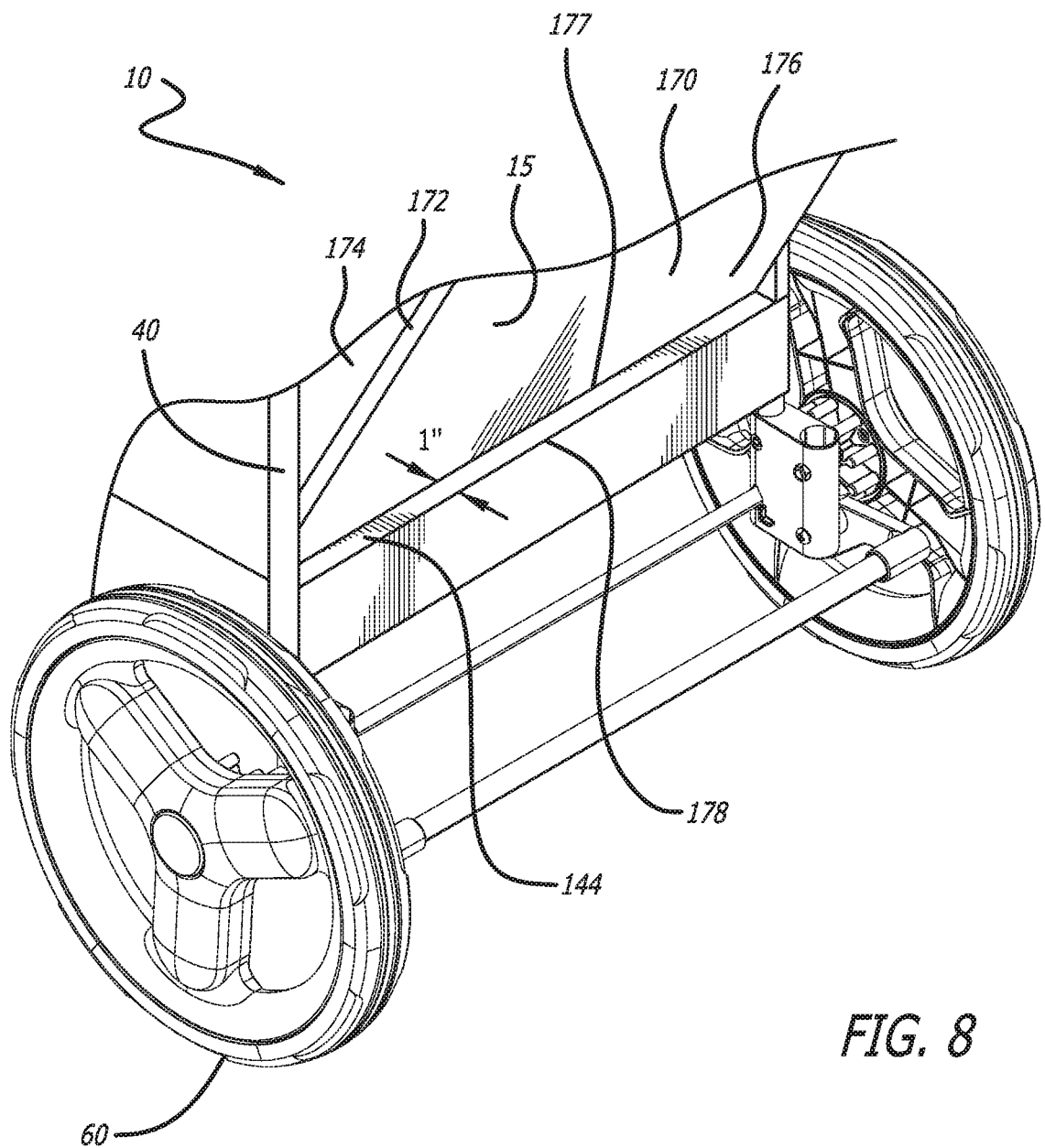
FIG. 8 is an opposing partial rear perspective view of the stroller wagon of FIG. 8 to show an offset of the hinge of the recline seatback according to one embodiment.

Additionally, as discussed above, in various embodiments the wagon 10 has at least one recline seatback 15. In one embodiment, a recline seatback 15 is provided at the rear wall 170 of the housing assembly 26 adjacent the second end of the wagon frame. The recline seatback 15 is adapted to be pivotally positioned in a generally vertical position (e.g., FIG. 6) and a plurality of angled positions (e.g., FIGS. 2 and 7-10). As shown in FIGS. 2 and 5-10, the recline seatback 15 generally comprises a reclining end portion 170 of the flexible housing 26 with a rigid wall member 145 therein and also preferably with padding. Further, in one embodiment the recline seatback 15 may also include a sidewall 174 that connects opposing sides 172 of the reclining end portion 170 of the recline seatback 15 to the opposing side portions 140 of the housing assembly 26, respectively. In one embodiment, as shown in FIGS. 7-10, the sidewall 174 of the recline seatback 15 is a portion of the flexible housing that is generally in the shape of a triangle or gusset 174. As shown in FIG. 8, the bottom 176 of the reclining end portion 170 of the recline seatback 15 is connected to the bottom wall 144 of the flexible housing 26 at a hinge 177. In one embodiment, the hinge 177 of the reclining seatback 15 is positioned a distance from the end 178 of the bottom wall 144, such as approximately 1" from the end 178 of the bottom wall 144 adjacent the second end of the wagon frame. Additionally, the recline seatback 15 may have a pocket 169 for storage, such as for storing the canopies 184, 186.

Figure 6:
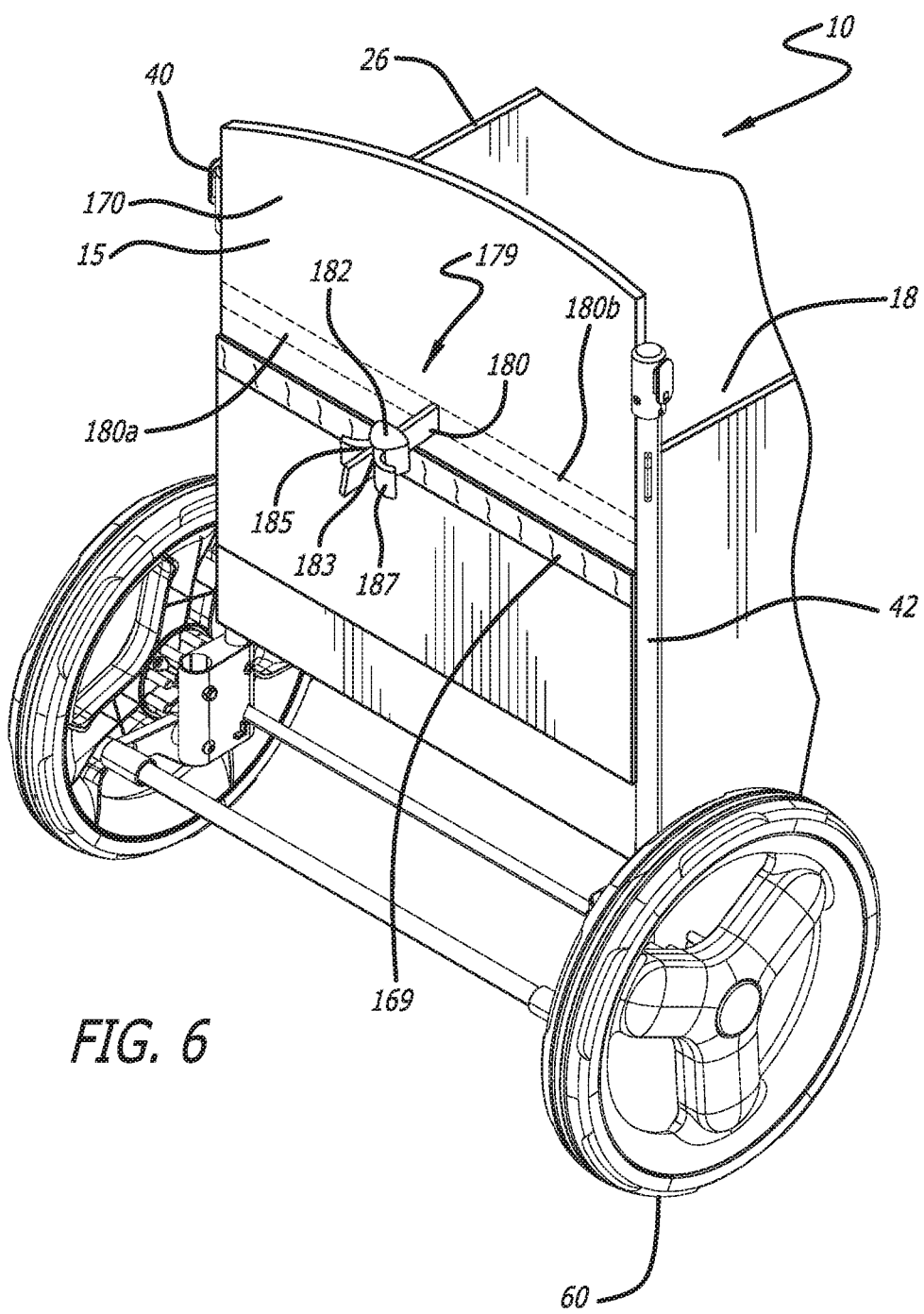
FIG. 6 is a rear perspective view of the stroller wagon of FIG. 1 with the push-pull handle removed and the recline seatback in the up or vertical position according to one embodiment.
Figure 7:
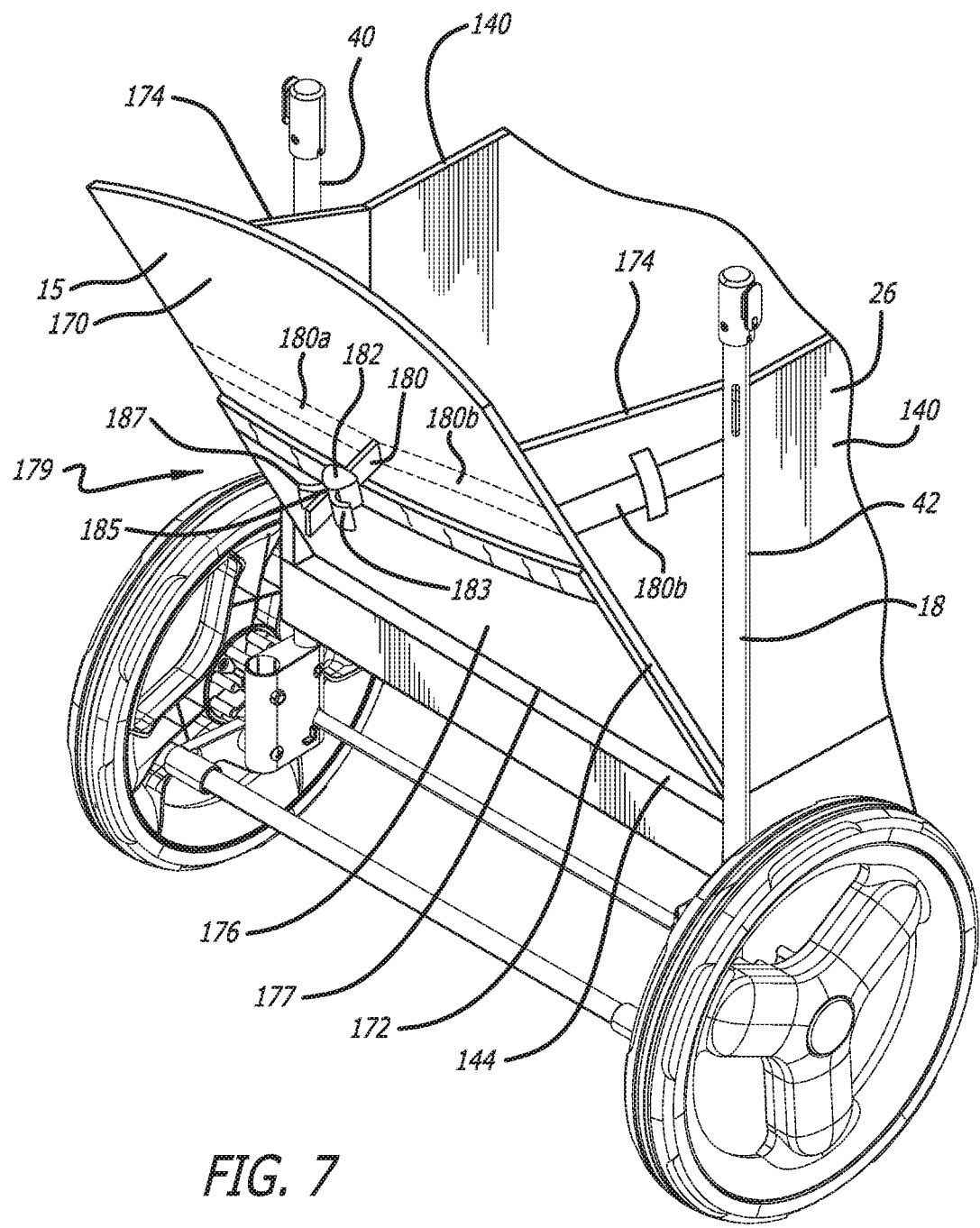
FIG. 7 is a rear perspective view of the stroller wagon of FIG. 1 with the push-pull handle removed and the recline seatback in a reclined or angled position according to one embodiment.

The reclining end portion 170 of the reclining seatback 15 is able to move from a first position, as shown in FIGS. 1 and 6, where the reclining end portion 170 of the reclining seatback 15 is generally vertical (the vertical position being at 0°), to a plurality of second positions, one second position shown in FIGS. 7-10, where the reclining end portion 170 of the reclining seatback 15 is reclined at an angle greater than 0°. The reclining end portion 170 of the reclining seatback 15 can recline at any angle between approximately 1° and 40°. As shown in FIGS. 7-10, the reclining end portion 170 of the reclining seatback 15 is fully reclined at approximately 40° from the vertical. While the embodiments shown in the present application illustrate only one reclining seatback 15 adjacent the second end assembly 18 of the wagon 10, the wagon 10 may alternately have a reclining seatback 15 adjacent the first end assembly 16 of the wagon 10 in addition to the reclining seatback 15 adjacent the second end assembly 18 of the wagon, or alternately the wagon 10 may have a reclining seatback 15 adjacent the first end assembly 16 of the wagon 10 and no reclining seatback 15 adjacent the second end assembly 18 of the wagon 10.

In one embodiment, as best shown in FIGS. 6-7 and 9-10, a seatback lock assembly 179 is provided with and connected to the recline seatback 15. The seatback lock assembly 179 assists in removably positioning the recline seatback 15 and fixing the recline seatback 15 in an angular position of a plurality of angular positions, including a generally vertical position. The seatback lock assembly 179 may comprise a strap 180 and locking member 182. In one embodiment, the strap 180 comprises a first strap 180*a* and a second strap 180*b*. The first strap 180*a* is connected to one of the rear vertical members 40 of the wagon frame, and the second strap 180*b* is connected to the other of the rear vertical members 42 of the wagon frame. The first strap 180*a* extends from the rear vertical member 40 along the side of one of the sidewalls 174 of the recline seatback 15 and then along the rear of the reclining end portion 170 of the recline seatback 15 to the locking member 182. Similarly, the second strap 180*b* extends from the other rear vertical member 42 along the side of the opposing sidewall 174 of the recline seatback 15 and then along the rear of the reclining end portion 170 of the recline seatback 15 to the locking member 182. In one embodiment the straps 180*a*, 180*b* extend within the rear of the reclining end portion 170 and then out an opening to pass to the locking member 182.

The locking member 182 preferably has an opening 183 to receive the first and second straps 180*a*, 180*b*, a spring member 185 and a release member 187. In one embodiment, the spring member 185 exerts pressure on the straps 180*a*, 180*b* within the opening 183 to retain the first and second straps 180*a*, 180*b* in the desired position. In such an embodiment the release member 187 moves the spring member 185 to an open position to allow the first and second straps 180*a*, 180*b* to transition within the opening of the locking member 182. In an alternate embodiment, the release member 187 opens and closes the opening 183 to allow the first and second straps to transition in the opening 183, and the spring member 185 exerts pressure on the release members 187 to retain the first and second straps 180*a*, 180*b* in the desired position.

As shown in the figures, the first and second straps 180*a*, 180*b* extend from the reclining end portion 170 of the recline seatback 15 and are threaded through the opening 183 in the locking member 182. The locking member 182 retains the straps 180*a*, 180*b* in the desired position until the user operates the locking member 182 to either tighten or loosen the straps 180*a*, 180*b* (i.e., either lengthening or shortening the amount of strap 180 between the locking member 182 and the vertical members 40, 42, respectively). In the tightened position, as shown in FIG. 6, the straps 180*a*, 180*b* are shortened between the locking member 182 and the rear vertical members 40, 42 to maintain the end portion 170 of the recline seatback 15 more vertical. When the straps 180*a*, 180*b* are loosened by the user loosening the locking member 182, more of the straps 180a, 180b are allowed between locking member 182 and the rear vertical members 40, 42, thereby allowing the end portion 170 of the recline seatback 15 to pivot at its hinge 177 and recline at an angle desired by the user.

Figure 11:
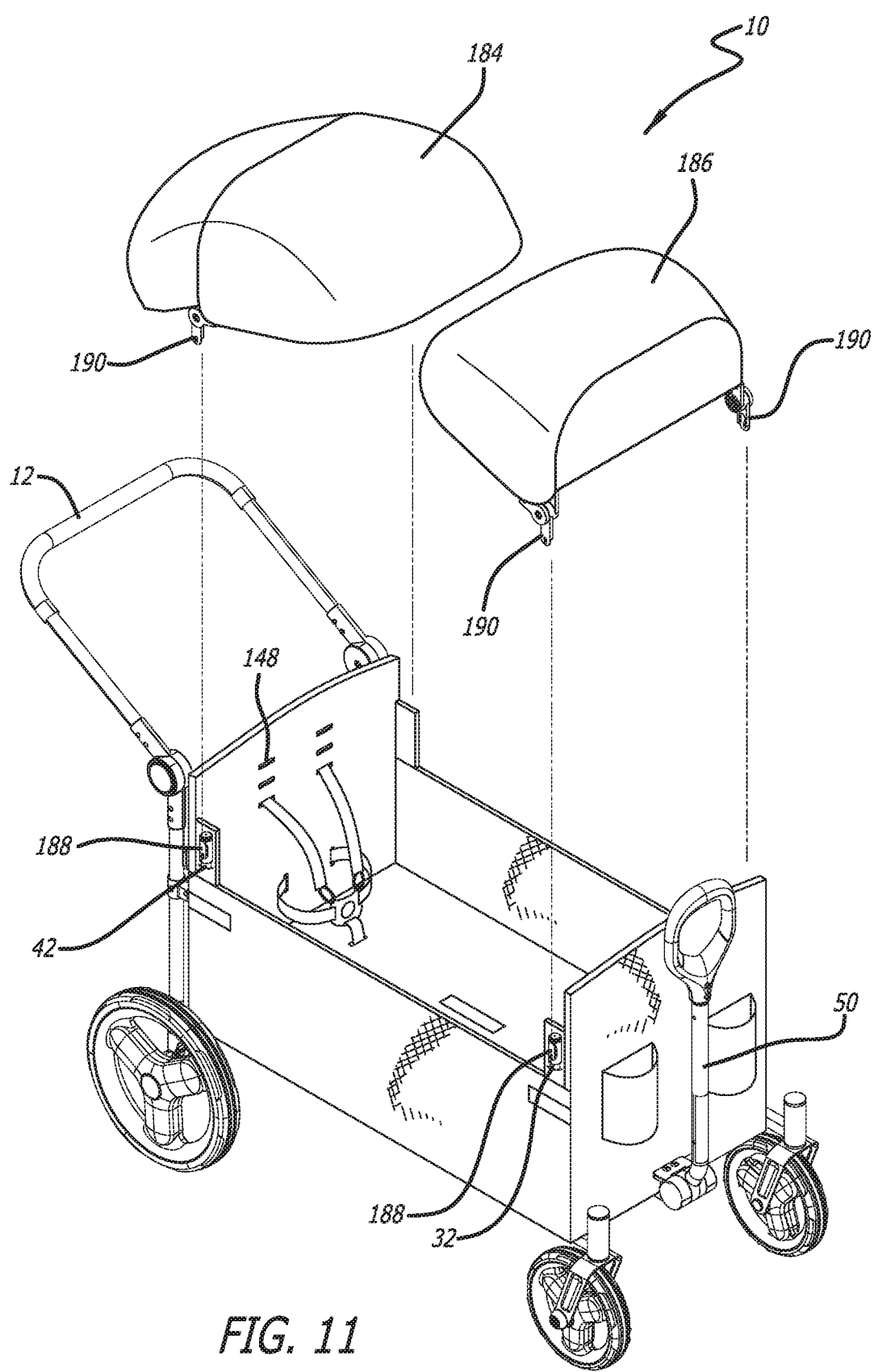
FIG. 11 is front perspective view of the stroller wagon of FIG. 1 showing the connection of the independent canopies to the stroller wagon according to one embodiment.
Figure 12:
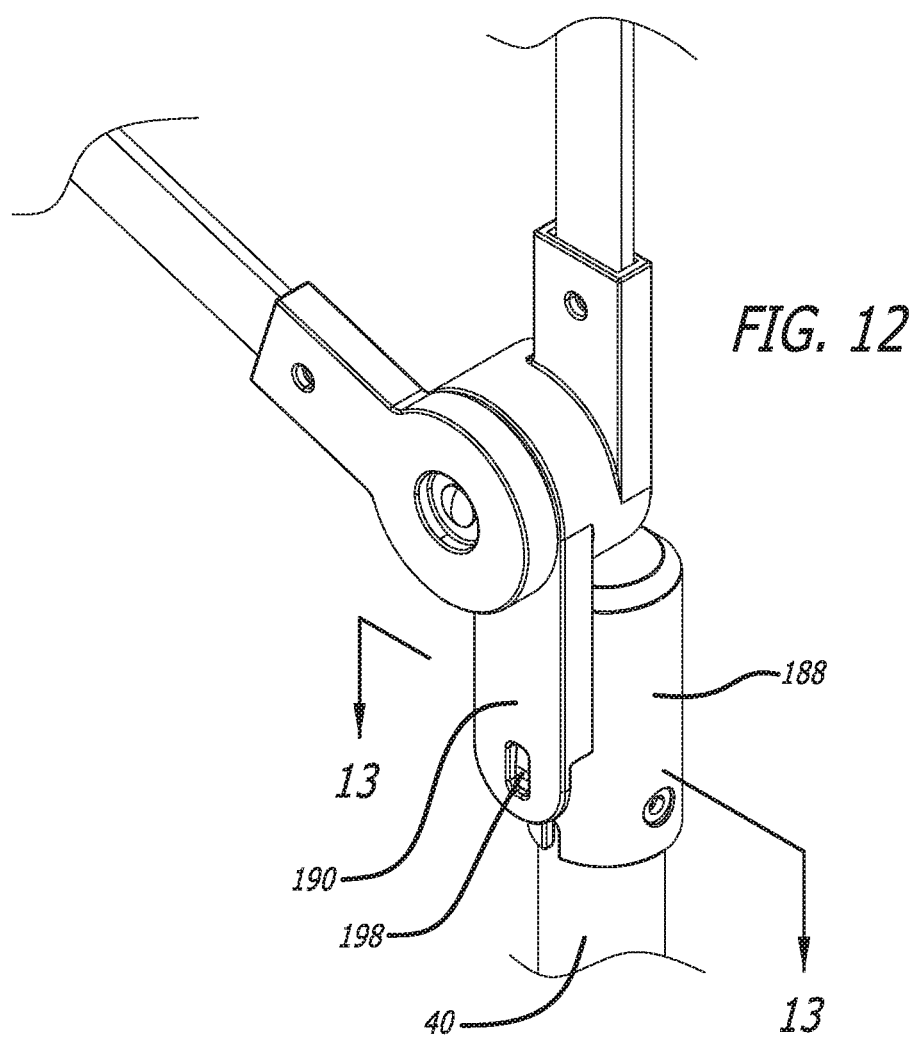
FIG. 12 is a partial perspective view of the connection mechanism of a canopy to the stroller wagon of FIG. 1 according to one embodiment.
Figure 13:
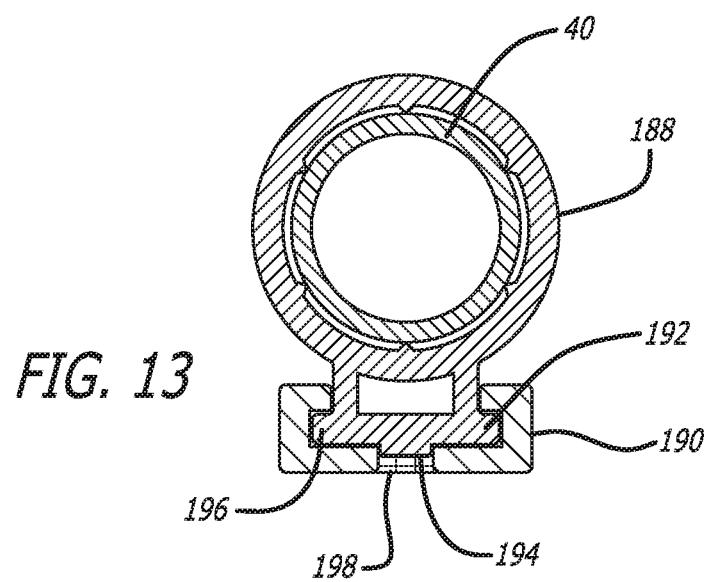
FIG. 13 is a cross-sectional view about line 12-12 of FIG. 12 according to one embodiment.

In various embodiments, the wagon 10 may also have one or more canopies 184 and 186. For example, in the embodiment of FIGS. 1-2 and 11, first and second separate and independent canopies 184 and 186 are provided for use at the first end assembly 16 and the second end assembly 18, respectively, of the wagon 10. In one such embodiment the canopies 184, 186 are each able to be separately secured or attached to the wagon frame 14 and removed separately therefrom. As shown in FIG. 11, in one embodiment, the rear canopy 184 is removably secured to the rear vertical members 40, 42, and the front canopy 186 is removably secured to the front vertical members 30, 32. The vertical members 30, 32, 40, 42 have canopy receivers 188 at top ends thereof as shown in FIGS. 12-15. Similarly, the canopies 184, 186 have snap on connectors 190 that removably secure to the canopy receivers 188. Referring to FIG. 11, the first or front canopy 186 has first and second snap on connectors 190 that removably secure to the first and second canopy receivers 188 at the first and second front vertical members 30, 32, respectively, and the second or rear canopy 184 has first and second snap on connectors 190 that removably secure to the third and fourth canopy receivers 188 at the first and second rear vertical members 40, 42, respectively.

Figure 15:
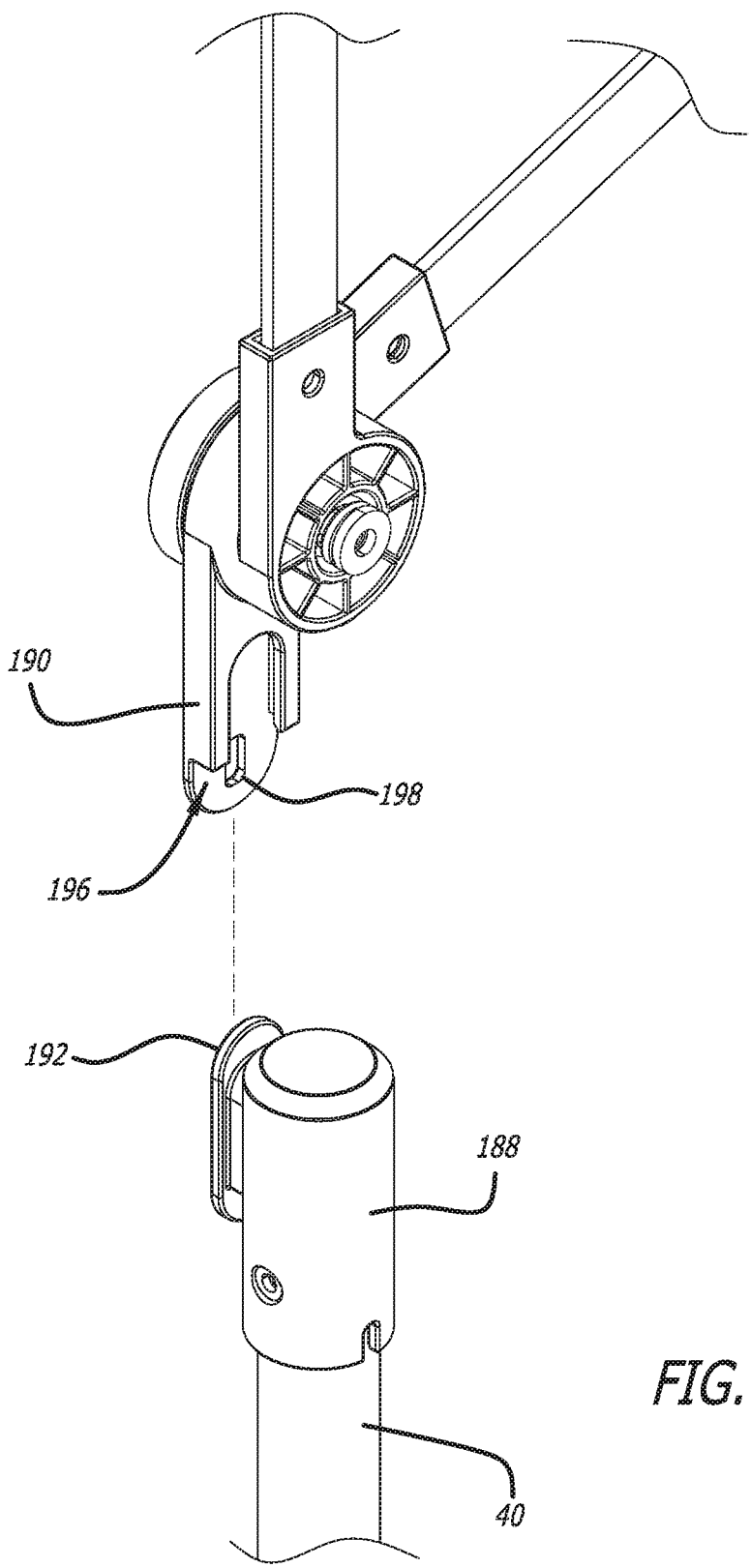
FIG. 15 is a rear partial perspective view of the canopy connector of the canopy assembly and canopy receiver of the wagon frame for the stroller wagon of FIG. 14 according to one embodiment.

In one embodiment, as shown in FIGS. 14 and 15, the canopy receivers 188 have a flange 192 with a protrusion 194. And, in one embodiment, the snap on connectors 190 have a slot 196 to receive the flange 192 of the receivers 188, and an opening 198 to receive the protrusion 194. Thus, to connect the canopy connectors 190 to the canopy receivers 188 the user slides the canopy connectors 190 onto the canopy receivers 188 by inserting the flange 192 of the receivers 188 into the slot 196 of the connectors 190. The protrusion 194, which may have a ramped or cammed surface 198, will flex out a portion of the connector 190 to allow the protrusion to pass by and engage the opening 198 in the connector 190. When this occurs that connector 190 is connected to its receiver 188. To remove the connector 190 from the receiver 188, the user pulls out the end of the connector 190 to remove the protrusion 194 from the opening 198 and slides the connector 190 upwardly.

Figure 9:
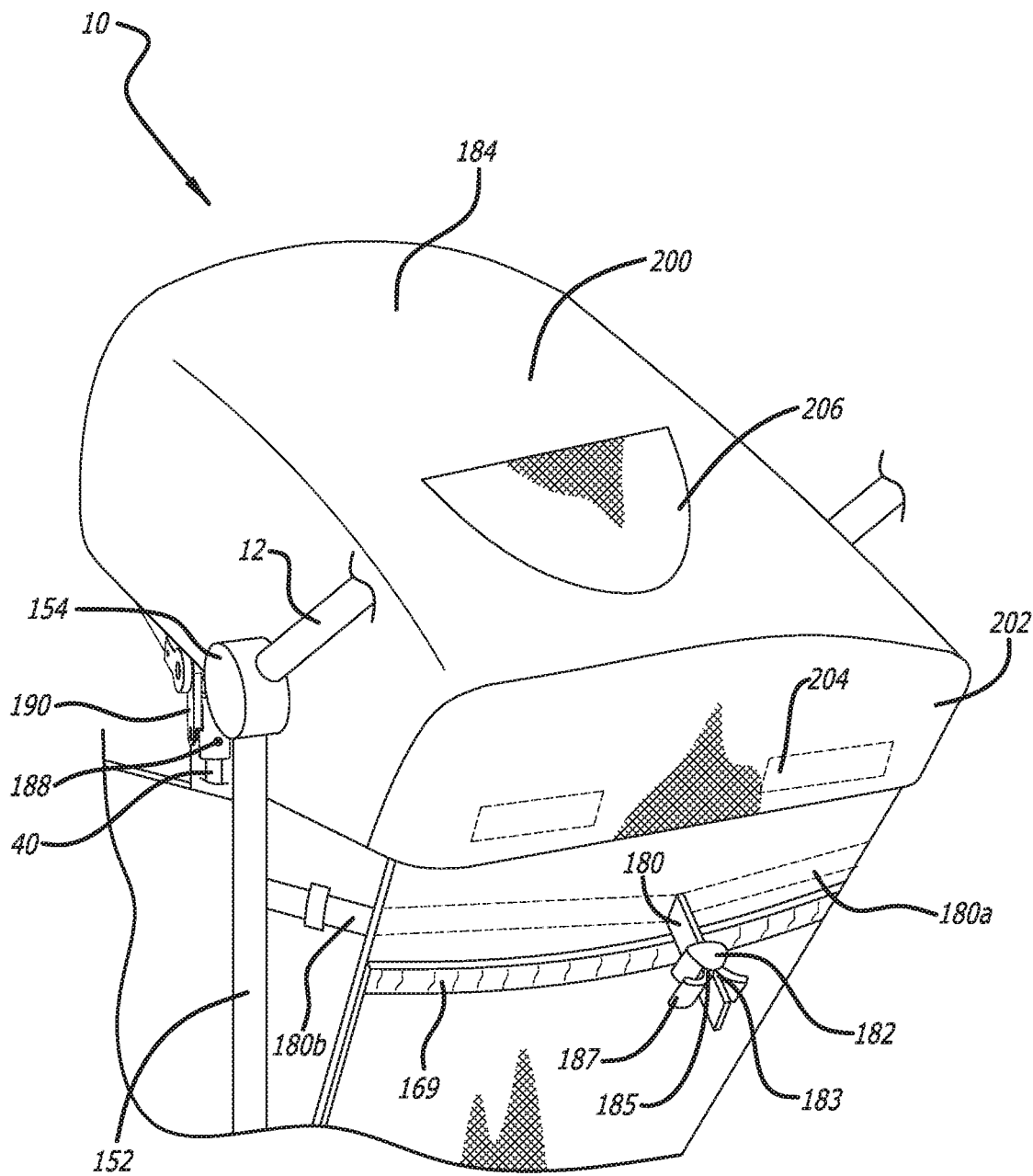
FIG. 9 is a partial rear perspective view of the stroller wagon of FIG. 1 with an independent canopy connected to the reclined seatback according to one embodiment.
Figure 10:
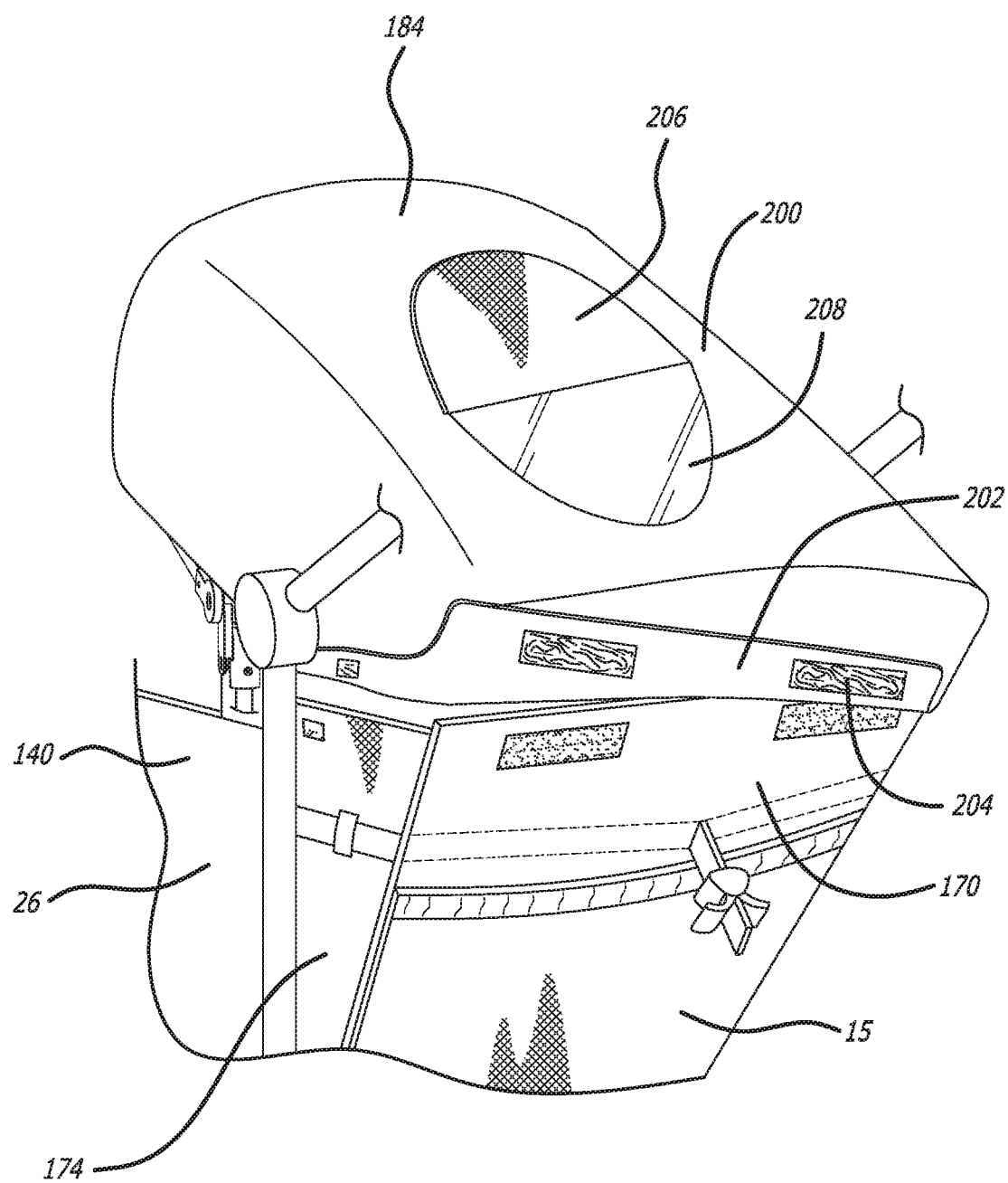
FIG. 10 is a partial rear perspective view of the stroller wagon of FIG. 9 showing the connection mechanism of the independent canopy to the reclined seatback according to one embodiment.

As shown in FIGS. 9 and 10, the rear canopy 184 has a top portion 200 and a connection portion 202. The connection portion 202 can be secured to the end portion 170 of the recline seatback 15, such as with Velcro 204 or other connection means. The top portion 200 of the rear canopy 184 may have a flap 206 that opens and closes a viewing window 208.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A stroller wagon comprising:
   a wagon frame having a first end and an opposing second end;
   a floor assembly connected to the wagon frame between the first end and the second end, wherein the wagon frame folds between an open configuration and a folded configuration;
   first and second rear wheels rotatably connected to the wagon frame adjacent the second end;
   first and second front wheels rotatably and pivotally connected to the wagon frame adjacent the first end;
   a handle pivotally connected to the first end of the wagon frame, the handle moveable between a use position and a storage position;
   a push bar pivotally connected to the second end of the wagon frame;
   a flexible housing connected to the wagon frame, the flexible housing comprising opposing sidewalls between the first end and the second end of the wagon frame, a front wall adjacent the first end of the wagon frame, a bottom wall adjacent the floor assembly of the wagon frame, and a recline seatback adjacent the second end of the wagon frame, wherein the recline seatback of the flexible housing is directly connected to the bottom wall of the flexible housing at a hinge, and wherein the recline seatback is pivotally positionable in a vertical position and a plurality of angled positions away from a cavity of the wagon; and,
   a seatback lock assembly connected to the recline seatback, the seatback lock assembly removably fixing the seatback in the plurality of angled positions including the vertical position.

2. The stroller wagon of claim 1, wherein the seatback lock assembly comprises a locking member and first and second straps, wherein the first strap is connected to a first vertical member at the second end of the wagon frame, and wherein the second strap is connected to a second vertical member at the second end of the wagon frame.

3. The stroller wagon of claim 2, wherein the locking member has an opening to receive the first and second straps, a spring member to exert pressure on the straps in the opening to retain the first and second straps in the desired position, and a release member to move the spring member to an open position to allow the first and second straps to transition in the opening of the locking member.

4. The stroller wagon of claim 1, wherein the recline seatback has a padded surface.

5. The stroller wagon of claim 1, wherein the flexible housing further comprises a pair of flexible fabric gussets connecting the recline seatback to the respective opposing sidewalls of the flexible housing.

6. The stroller wagon of claim 1, wherein the hinge of the reclining seatback is positioned a distance from an end of the bottom wall adjacent the second end of the wagon frame.

7. The stroller wagon of claim 1, wherein the push bar is lockably positionable in a storage position and a plurality of use positions.

8. The stroller wagon of claim 1, wherein the wagon frame has a first end assembly at the first end of the wagon frame, and an opposing second end assembly at the second end of the wagon frame.

9. The stroller wagon of claim 8, wherein the first end assembly comprises a pair of front vertical members connected by a front lower cross support towards a bottom of the pair of front vertical members, wherein the second end assembly comprises a pair of rear vertical members connected by a rear lower cross support towards a bottom of the pair of rear vertical members, wherein the wagon frame has no cross support towards a top of the first end assembly, and wherein the wagon frame has no cross support towards a top of the second end assembly.

10. The stroller wagon of claim 8, wherein the first end assembly comprises a pair of front vertical members, wherein the second end assembly comprises a pair of rear vertical members, and wherein each of the vertical members has a canopy receiver at a top thereof.

11. The stroller wagon of claim 10, further comprising a first independent canopy at the first end of the wagon frame and a second independent canopy at the second end of the wagon frame, the first independent canopy having first and second snap on connectors that removably secure to the receivers of the pair of front vertical members, respectively, and the second independent canopy having first and second snap on connectors that removably secure to the receivers of the pair rear vertical members, respectively.

12. The stroller wagon of claim 11, wherein the first independent canopy and the second independent canopy are each independently attachable and removable from the wagon.

13. The stroller wagon of claim 1, wherein the handle is spring loaded and biased toward the vertical position.

14. The stroller wagon of claim 1, wherein the push bar is connected to the second end of the wagon frame, and wherein the push bar has a ratchet mechanism to pivotally secure the push bar in a plurality of angular positions.

15. The stroller wagon of claim 14, further comprising a spring-loaded button to disengage a ratchet in the ratchet mechanism to adjust an angular position of the push bar.

16. The stroller wagon of claim 1, wherein the floor assembly comprises a first floor assembly pivotal with respect to the first end of the wagon frame, and a second floor assembly pivotal with respect to the second end of the wagon frame, and wherein the first floor assembly is pivotable with respect to the second floor assembly to allow for folding of the wagon frame.

17. The stroller wagon of claim 16, further comprising a linkage assembly under the floor assembly, the linkage assembly having a first linkage pivotally connected to the first end of the wagon frame and a second linkage pivotally connected to the second end of the wagon frame, wherein the first linkage is also pivotally connected to the second linkage.

18. A stroller wagon comprising:
a wagon frame having a first end assembly and an opposing second end assembly;
first and second rear wheels rotatably connected to the wagon frame adjacent the second end assembly;
first and second front wheels rotatably and pivotally connected to the wagon frame adjacent the first end assembly;
a push bar pivotally connected to the second end assembly, wherein the push bar has a ratchet mechanism to pivotally secure the push bar in a plurality of angularly located use positions and a storage position;
a flexible housing connected to the wagon frame, the flexible housing comprising opposing sidewalls between the first end assembly and the second end assembly, a front wall adjacent the first end assembly, a bottom wall, and a recline seatback adjacent the second end assembly, wherein the recline seatback of the flexible housing is directly connected to the bottom wall of the flexible housing at a hinge and is pivotable about the hinge between a vertical position and a plurality of angled positions away from a cavity of the wagon; and,
a seatback lock assembly connected to the recline seatback, the seatback lock assembly removably fixing the seatback in a plurality of angled positions including a vertical position.

19. The stroller wagon of claim 18, wherein the seatback lock assembly comprises a locking member and first and second straps, wherein the first strap is connected to a first vertical member of the second end assembly and wherein the second strap is connected to a second vertical member of the second end assembly.

20. The stroller wagon of claim 19, wherein the locking member has an opening to receive the first and second straps, a release member to open and close the opening to allow the first and second straps to transition in the opening of the locking member, and a spring member to exert pressure on the release members to retain the first and second straps in the desired position.

21. The stroller wagon of claim 18, wherein the first end assembly comprises a pair of front vertical members, wherein the second end assembly comprises a pair of rear vertical members, and wherein each of the vertical members has a canopy receiver at a top thereof, and further comprising a first independent canopy and a second independent canopy, the first independent canopy having first and second snap on connectors that removably secure to the receivers of the pair of front vertical members, respectively, and the second independent canopy having first and second snap on connectors that removably secure to the receivers of the pair of rear vertical members, respectively.

22. The stroller wagon of claim 18, wherein the wagon frame folds between an open configuration and a folded configuration, wherein the wagon frame has a floor assembly between the first end assembly and the second end assembly, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame, wherein the wagon frame further has a linkage assembly under the floor assembly, the linkage assembly having a first linkage pivotally connected to the first end assembly and a second linkage pivotally connected to the second end assembly, wherein the first linkage is also pivotally connected to the second linkage.

23. A stroller wagon comprising:
a wagon frame having a first end assembly and an opposing second end assembly, wherein the first end assembly comprises first and second front vertical members connected by a front lower cross support towards a bottom of the first and second front vertical members, wherein the second end assembly comprises first and second rear vertical members connected by a rear lower cross support towards a bottom of the first and second rear vertical members, and wherein the wagon frame folds to bring the first end assembly toward the second end assembly;
first and second rear wheels rotatably connected to the wagon frame adjacent the second end assembly;
first and second front wheels rotatably and pivotally connected to the wagon frame adjacent the first end assembly;
a flexible housing connected to the wagon frame, the flexible housing comprising opposing sidewalls between the first end assembly and the second end assembly, a front wall adjacent the first end assembly, a bottom wall, and a recline seatback adjacent the second end assembly, wherein the recline seatback of the flexible housing is directly connected to the bottom wall of the flexible housing at a hinge and is pivotable about the hinge between a vertical position and a plurality of angled positions away from a cavity of the wagon;
a first canopy receiver connected to a top of the first front vertical member;
a second canopy receiver connected to a top of the second front vertical member;
a third canopy receiver connected to a top of the first rear vertical member;
a fourth canopy receiver connected to a top of the second rear vertical member;
a first independent canopy having first and second snap on connectors that removably secure to the first and second canopy receivers, respectively; and,
a second independent canopy having first and second snap on connectors that removably secure to the third and fourth canopy receivers, respectively.

24. The stroller wagon of claim 23, further comprising a seatback lock assembly for the recline seatback, the seatback lock assembly comprising a locking member and first and second straps, wherein the first strap is connected to the first rear vertical member of the second end assembly and wherein the second strap is connected to the second rear vertical member of the second end assembly.

25. The stroller wagon of claim 24, wherein the locking member has an opening to receive the first and second straps, a spring member to bias the locking member to the closed position, and a release member to open and close the opening on the first and second straps to allow the first and second straps to transition in the opening of the locking member.

26. The stroller wagon of claim 23, wherein the second independent canopy is connected to the recline seatback.

* * * * *